United States Patent
Hamann et al.

(10) Patent No.: US 10,047,173 B2
(45) Date of Patent: Aug. 14, 2018

(54) LOW VINYL BOND MODIFIED ELASTOMERIC COPOLYMERS

(71) Applicant: Trinseo Europe GmbH, Horgen (CH)

(72) Inventors: Evemarie Hamann, Halle (DE); Joachim Kiesekamp, Schkopau (DE); Sven Thiele, Halle (DE); Daniel Heidenreich, Halle (DE)

(73) Assignee: TRINSEO EUROPE GMBH, Horgen (CH)

( * ) Notice: Subject to any disclaimer, the term of this patent is extended or adjusted under 35 U.S.C. 154(b) by 107 days.

(21) Appl. No.: 15/025,400

(22) PCT Filed: Sep. 27, 2013

(86) PCT No.: PCT/EP2013/070227
§ 371 (c)(1),
(2) Date: Mar. 28, 2016

(87) PCT Pub. No.: WO2015/043660
PCT Pub. Date: Apr. 2, 2015

(65) Prior Publication Data
US 2016/0222138 A1    Aug. 4, 2016

(51) Int. Cl.
| | | |
|---|---|---|
| *C08C 19/25* | (2006.01) | |
| *C08C 19/44* | (2006.01) | |
| *C08K 3/36* | (2006.01) | |
| *C08L 9/06* | (2006.01) | |
| *C08F 36/06* | (2006.01) | |
| *C08F 212/08* | (2006.01) | |

(52) U.S. Cl.
CPC .............. *C08C 19/25* (2013.01); *C08C 19/44* (2013.01); *C08F 36/06* (2013.01); *C08K 3/36* (2013.01); *C08L 9/06* (2013.01); *C08F 212/08* (2013.01); *C08L 2207/04* (2013.01)

(58) Field of Classification Search
CPC ......... C08C 19/25; C08C 19/44; C08K 3/003; C08K 3/36
See application file for complete search history.

(56) References Cited

U.S. PATENT DOCUMENTS

| | | |
|---|---|---|
| 3,078,254 A | 2/1963 | Zelinski |
| 3,244,664 A | 4/1966 | Zelinski |
| 3,281,383 A | 10/1966 | Zelinski |
| 3,692,874 A | 9/1972 | Farrar |
| 3,978,103 A | 8/1976 | Meyer-Simon |
| 4,048,206 A | 9/1977 | Voronkov |
| 4,474,908 A | 10/1984 | Wagner |
| 4,616,069 A | 10/1986 | Watanabe |
| 5,017,636 A | 5/1991 | Hattori et al. |
| 6,777,569 B1 | 8/2004 | Westmeyer |
| 8,258,241 B2 | 9/2012 | Tanaka et al. |
| 2005/0124740 A1 | 6/2005 | Klockmann |
| 2008/0287601 A1* | 11/2008 | Thiele ............ B60C 1/0016 524/588 |
| 2011/0230593 A1 | 9/2011 | Kondo |
| 2012/0065319 A1 | 3/2012 | Backer et al. |
| 2013/0150511 A1 | 6/2013 | Hirokami |

FOREIGN PATENT DOCUMENTS

| | | |
|---|---|---|
| CN | 101316730 A | 12/2008 |
| CN | 102066426 A | 5/2011 |
| CN | 102199316 A | 9/2011 |
| CN | 103145750 A | 6/2013 |
| EP | 2 366 557 A1 | 9/2011 |
| EP | 2 602 262 | 6/2013 |
| EP | 2 602 262 A1 | 6/2013 |
| EP | 2 607 103 A2 | 6/2013 |
| JP | S59-24702 | 2/1984 |
| JP | H01135847 A | 5/1989 |
| JP | 2007-270020 A | 10/2007 |
| JP | 2012-172077 A | 9/2012 |
| RU | 2260600 C1 | 9/2005 |
| RU | 2481361 C2 | 5/2013 |
| RU | 2011141342 A | 6/2013 |
| WO | WO 2007/047943 | 4/2007 |
| WO | WO 2009/148932 | 12/2009 |
| WO | WO 2011/002830 A2 | 1/2011 |

OTHER PUBLICATIONS

International Standard (ISO) Reference No. 4664-1:2005(E); Rubber, Vulcanized or thermoplastic; Determination of dynamic properties—part 1: General guidance, First Edition Feb. 15, 2005 (30 pages).
PCT/EP2013/070227 International Preliminary Report on Patentability dated Mar. 29, 2016 (8 pages).
Office Action, and English language translation thereof, in corresponding Chinese Application No. 201380079829.9, dated Apr. 5, 2017, 19 pages.
PCT/EP2013/070227 International Search Report and Written Opinion dated Sep. 30, 2014 (13 pages).
Shibita et al., Abstract, NPL Citation XP002693626, Rubber composition, method for producing same, and tire having tread showing superior rebound resilience and low rolling resistance, Publication data: CA, Aug. 16, 2012; Chemical Abstracts Service, Columbus, Ohio, US, Publisher accession No. 157-329009.

(Continued)

*Primary Examiner* — Peter D. Mulcahy
(74) *Attorney, Agent, or Firm* — Barnes & Thornburg LLP; G. Peter Nichols

(57) ABSTRACT

The present invention relates to a modified elastomeric polymer obtained by reacting a living anionic elastomeric polymer and specific chain end modifying compound, wherein the living anionic elastomeric polymer comprises more than 70% and less than 99% by weight of butadiene units and more than 1% and less than 30% by weight of styrene units and has a vinyl bond content of from 2 to less than 10%, based on the polybutadiene fraction of the living anionic elastomeric polymer. The invention further relates to a method of preparing the modified elastomeric polymer and to an elastomeric polymer composition comprising the modified elastomeric polymer.

22 Claims, No Drawings

(56) References Cited

OTHER PUBLICATIONS

Ryouji et al., Abstract, NPL Citation XP002693625, Modified conjugated diene rubbers, their manufacture and their rubber compositions for tire treads with low fuel cost, Publication data: CA, Dec. 2015, 2011, Chemical Abstracts Service, Columbus, Ohio, US, Publisher accession No. 156-36336.

Search Report, and English language translation thereof, in corresponding Russian Federation Application No. 2016116287/05(025545), dated Dec. 18, 2017, 5 pages.

\* cited by examiner

LOW VINYL BOND MODIFIED ELASTOMERIC COPOLYMERS

This application claims priority to PCT/EP2013/070227 filed Sep. 27, 2013, the entire contents of which is incorporated herein by reference.

FIELD OF THE INVENTION

This invention generally relates to modified elastomeric polymers having a low vinyl bond content, their use in the preparation of elastomeric polymer compositions, and vulcanized articles prepared from the elastomeric polymer compositions. The invention specifically relates to the modification of "living" anionic elastomeric polymers having a low content of 1,2-added butadiene, also referred to as "1,2-bonds" or "vinyl bonds", with a silane sulfide modifying agent, or with a combination of at least two silane modifying agents in sequence, to form a modified elastomeric polymer. The modified elastomeric polymers are reactive towards fillers or other components present in an elastomeric polymer composition. The corresponding elastomeric polymer compositions can be used for preparing vulcanized and, thus, crosslinked elastomeric compositions having relatively low hysteresis loss. Such vulcanized elastomeric polymer compositions are useful in many articles, including tire treads having low rolling resistance in combination with a good balance of other desirable physical and chemical properties, for example, wet skid properties, abrasion resistance, tensile strength and processability.

BACKGROUND OF THE INVENTION

Increasing oil prices and national legislation demand the reduction of automotive carbon dioxide emissions and, therefore, force tire and rubber producers to provide "fuel efficient" tires. One general approach to obtain fuel efficient tires is to produce rubber formulations that have reduced hysteresis loss.

A major source of hysteresis in vulcanized elastomeric polymers is attributed to free polymer chain ends, i.e. that section of the elastomeric polymer chain between the last crosslink and the end of the polymer chain. This free end of the polymer does not participate in any efficient elastically recoverable process. As a result, any energy transmitted to this section of the polymer is lost. The dissipated energy leads to a pronounced hysteresis under dynamic deformation.

Another source of hysteresis in vulcanized elastomeric polymers is attributed to an insufficient distribution of filler particles in the vulcanized elastomeric polymer composition. The hysteresis loss of a crosslinked elastomeric polymer composition is related to its tan $\delta$ at 60° C. value (see ISO 4664-1:2005; Rubber, Vulcanized or thermoplastic; Determination of dynamic properties—part 1: General guidance). In general, vulcanized elastomeric polymer compositions having a relatively small tan $\delta$ at 60° C. are preferred for having a reduced hysteresis loss. In the final tire product, this translates into a lower rolling resistance and better fuel efficiency.

One generally accepted approach for reducing hysteresis loss lies in the reduction of the number of free chain ends of elastomeric polymers. Various techniques have been described in the literature, including the use of coupling agents such as tin tetrachloride, which may functionalize the polymer chain end and react with, for example, filler or unsaturated portions of the polymer (see U.S. Pat. Nos. 3,281,383, 3,244,664, 3,692,874, 3,978,103, 4,048,206, 4,474,908, 6,777,569, 3,078,254 and 4,616,069 and US 2005/0124740). The use of coupling agents as reactants for living polymers usually results in the formation of polymer blends comprising one fraction of linear or non-coupled polymers and one or more fractions comprising more than two polymer arms at the coupling point. Silicon tetrahalide is a typical example of silicone halide-based coupling agents.

WO 2007/047943 describes the use of a silane-sulfide modifier to produce a chain end-modified elastomeric polymer which is used in a vulcanized elastomeric polymer composition such as a tire tread. This document describes the reaction between a silane-sulfide compound and anionically-initiated living polymers to produce chain end-modified polymers which are subsequently blended and reacted with fillers, vulcanizing agents, accelerators or oil extenders to produce a vulcanized elastomeric polymer composition having low hysteresis loss. To further control polymer molecular weight and polymer properties, a coupling agent ("linking agent") can be used as an optional component in the process. The modifier is then added before, after or during the addition of the coupling agent, and the modification reaction is preferably carried out after the addition of the coupling agent.

WO 2009/148932 describes the combined use of two modifier compounds which are sequentially reacted with a living anionic elastomeric polymer to produce a modified elastomeric polymer in order to reduce the tire-related rolling resistance and associated fuel consumption.

Despite the improvement in hysteresis loss, the teaching provided in WO 2007/047943 and WO 2009/148932 provides vulcanized articles having a wet skid resistance ("wet grip performance") which is insufficient for certain applications.

Low vinyl bond polymers having a low proportion of 1,2-polybutadiene in the polybutadiene fraction of the butadiene copolymer or in polybutadiene homopolymer are used in tire treads and tire side wall compounds owing to their improved abrasion resistance. In contrast, their wet grip performance is unsatisfactory. The best polymers on the market in terms of their abrasion resistance are high cis-polybutadienes produced with a neodymium-based Ziegler-Natta catalyst and having a vinyl bond content of <2% and a glass transition temperature (Tg) in the order of about −105° C. As a result, low vinyl bond polymers have been used mainly as additives in polymer mixtures for improving abrasion resistance.

Wet grip and rolling resistance of a vulcanized polymer also depend strongly on its Tg, which again is influenced by the vinyl bond content in the vulcanized polymer, i.e. a low vinyl bond content is associated with a low Tg. For accomplishing beneficial properties of a vulcanized elastomeric polymer composition for use in tire treads, there is the desire to balance abrasion resistance and wet grip while simultaneously lowering both rolling resistance and heat build-up as much as possible.

SUMMARY OF THE INVENTION

The inventors surprisingly found that appropriate wet grip in combination with improved abrasion resistance can be accomplished in a vulcanized elastomeric polymer by using a living anionic elastomeric polymer having a low vinyl bond content and subjecting it to a specific chemical modification. When used in a tire, the vulcanized modified elastomeric polymer has an improved (reduced) rolling resistance, while maintaining the wet grip properties known from modified elastomeric polymers.

In a first aspect, the present invention provides a modified elastomeric polymer based on a living anionic elastomeric polymer comprising more than 70% and less than 99% by weight of butadiene units and more than 1% and less than 30% by weight of styrene units and having a vinyl bond content of from 2 to less than 10%, based on the polybutadiene fraction of the living anionic elastomeric polymer. Strictly speaking, in view of its contents of both butadiene and styrene, the living anionic elastomeric polymer is a "copolymer", but is referred to herein as a "polymer" for the sake of convenience. The modified elastomeric polymer is obtained by reacting the living anionic elastomeric polymer and one or more modifying compounds.

In a second aspect, the present invention further provides an elastomeric polymer composition comprising the modified elastomeric polymer of the first aspect of the invention and one or more further components selected from components which are added to or formed as a result of the polymerization process used for making the modified elastomeric polymer of the first aspect of the invention and components which remain after solvent removal from the polymerization process. Components which are added to the polymerization process include, in particular, oils (extender oils), fillers, stabilizers and further elastomeric polymers.

In one embodiment of the first aspect of the invention, the modified elastomeric polymer is obtained by reacting the living anionic elastomeric polymer and a modifying compound of the following formula (I):

$(R''O)_x(R)_ySi\text{—}R'\text{—}S\text{—}SiR_3$  Formula (I)

wherein R is independently $C_1$-$C_{16}$ alkyl or benzyl; R" is $C_1$-$C_4$ alkyl; R' is selected from $C_6$-$C_{18}$ aryl, $C_7$-$C_{50}$ alkylaryl, $C_1$-$C_{50}$ alkyl and $C_2$-$C_{50}$ dialkylether (i.e. -alkyl-O-alkyl-), wherein each group is optionally substituted with one or more groups selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl)amino, tris($C_1$-$C_7$ hydrocarbyl)silyl and $C_1$-$C_{12}$ thioalkyl; x is an integer selected from 1, 2 and 3; y is an integer selected from 0, 1 and 2; and x+y=3.

The present invention further provides a method of preparing the modified elastomeric polymer, comprising the step of reacting the living anionic elastomeric polymer and the modifying compound of formula (I).

In another embodiment of the first aspect of the invention, the modified elastomeric polymer is obtained by reacting the living anionic elastomeric polymer with at least one of the modifying compounds of the following formulas (1) and (2) and at least one of the modifying compounds of the following formulas (3), (4), (5) and (6):

$(R^1O)_3Si\text{—}R^4\text{—}S\text{—}SiR^3_3$  Formula (1)

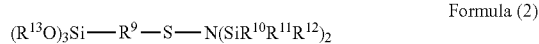

$(R^{13}O)_3Si\text{—}R^9\text{—}S\text{—}N(SiR^{10}R^{11}R^{12})_2$  Formula (2)

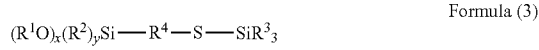

$(R^1O)_x(R^2)_ySi\text{—}R^4\text{—}S\text{—}SiR^3_3$  Formula (3)

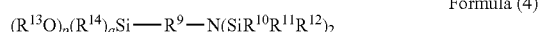

$(R^{13}O)_p(R^{14})_qSi\text{—}R^9\text{—}S\text{—}N(SiR^{10}R^{11}R^{12})_2$  Formula (4)

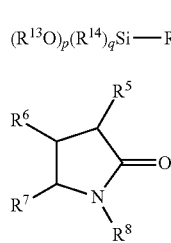

Formula (5)

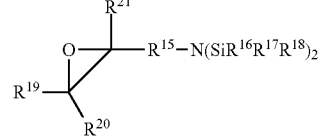

Formula (6)

wherein $R^2$, $R^3$, $R^{10}$, $R^{11}$, $R^{12}$, $R^{14}$, $R^{16}$, $R^{17}$ and $R^{18}$ are independently selected from $C_1$-$C_{16}$ alkyl and benzyl, wherein alkyl groups for $R^{10}$, $R^{11}$ and $R^{12}$ and for $R^{16}$, $R^{17}$ and $R^{18}$ may bond to each other so as to form a ring comprising two Si atoms and N; $R^1$ and $R^{13}$ are independently selected from $C_1$-$C_4$ alkyl; $R^4$, $R^9$ and $R^{15}$ are independently selected from $C_6$-$C_{18}$ aryl, $C_7$-$C_{50}$ alkylaryl, $C_1$-$C_{50}$ alkyl and $C_2$-$C_{50}$ dialkylether (i.e. -alkyl-O-alkyl-), wherein each group is optionally substituted with one or more groups selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl)amino, tris($C_1$-$C_7$ hydrocarbyl)silyl and $C_1$-$C_{12}$ thioalkyl; $R^5$, $R^6$ and $R^7$ are independently selected from hydrogen, $C_1$-$C_{16}$ alkyl and $C_6$-$C_{12}$ aryl; $R^8$ is selected from $C_1$-$C_{16}$ alkyl and $C_6$-$C_{12}$ aryl; and $R^{19}$, $R^{20}$ and $R^{21}$ are independently selected from hydrogen and $C_1$-$C_{16}$ alkyl; x and p are each an integer selected from 1 and 2; y and q are each an integer selected from 1 and 2; x+y=3; and p+q=3.

The present invention further provides a method of preparing the modified elastomeric polymer, comprising the steps of (i) reacting the living anionic elastomeric polymer and at least one of the modifying compounds of formulas (1) and (2) to provide a modified polymer and (ii) reacting the modified polymer and at least one of the modifying compounds of formulas (3), (4), (5) and (6).

DETAILED DESCRIPTION OF THE INVENTION

Definitions 1,2-Added butadiene (or "vinyl bonds" or "1,2-bonds") as used herein refers to 1,3-butadiene monomers incorporated in the polymer chain via the first and second carbon atom of the monomer molecule. The content of 1,2-added butadiene (or vinyl bond content) is expressed as percent (or weight percent) relative to the total amount of butadiene in the polymer.

The term "living anionic elastomeric polymer" as used herein refers to a polymer which has at least one reactive or "living" anionic end group.

Alkyl groups as defined herein, whether as such or in association with other groups, such as alkylaryl or alkoxy, include both straight chain alkyl groups, such as methyl (Me), ethyl (Et), n-propyl (Pr), n-butyl (Bu), n-pentyl, n-hexyl, etc., branched alkyl groups, such as isopropyl, tert-butyl, etc., and cyclic alkyl groups, such as cyclohexyl.

Alkoxy groups as defined herein include methoxy (MeO), ethoxy (EtO), propoxy (PrO), butoxy (BuO), isopropoxy, isobutoxy, pentoxy, etc.

Aryl groups as defined herein include phenyl, biphenyl and other benzenoid compounds. Aryl groups preferably contain only one aromatic ring and most preferably contain a $C_6$ aromatic ring.

Alkylaryl groups as defined herein refer to a combination of one or more aryl groups bonded to one or more alkyl groups, for example in the form of alkyl-aryl, aryl-alkyl, alkyl-aryl-alkyl and aryl-alkyl-aryl. Alkylaryl groups preferably contain only one aromatic ring and most preferably contain a $C_6$ aromatic ring.

Living Anionic Elastomeric Polymer

The living anionic elastomeric polymer used in the present invention is a copolymer of butadiene and styrene and optionally one or more further comonomers. The amount of butadiene in the living anionic elastomeric polymer is more than 70% and less than 99% by weight, based on the total weight of the polymer. The amount of butadiene may be at least 75%, at least 85%, or at least 90% by weight. The amount of styrene in the living anionic elastomeric polymer is more than 1% and less than 30% by weight, based on the total weight of the polymer. The amount of styrene is preferably at least 2%, more preferably at least 4%, even more preferably at least 6% by weight. In one embodiment, the living anionic elastomeric polymer is a copolymer of only butadiene and styrene with more than 1% and less than 30% by weight of styrene, preferably from 5% to 25% by weight, more preferably from 8% to 20% by weight of styrene. The styrene-butadiene copolymer includes a partially hydrogenated styrene-butadiene copolymer.

Comonomers other than butadiene and styrene which may be used in preparing the living anionic elastomeric polymer include unsaturated monomers such as α-olefins, internal olefins, conjugated dienes, non-conjugated dienes, aromatic vinyl monomers and acrylic monomers. Suitable α-olefins include $C_{2-20}$ α-olefins, such as ethylene, propylene, and 1-butene. Suitable conjugated dienes include 2-methyl-1,3-butadiene (isoprene), 2,3-dimethyl-1,3-butadiene, 1,3-pentadiene, 2,4-hexadiene, 1,3-hexadiene, 1,3-heptadiene, 1,3-octadiene, 2-methyl-2,4-pentadiene, cyclopentadiene, 2,4-hexadiene and 1,3-cyclooctadiene. Suitable non-conjugated dienes include norbornadiene, ethylidenenorbornene, 1,4-hexadiene, 1,5-hexadiene, 1,7-octadiene and 4-vinylcyclohexene. Suitable aromatic vinyl monomers include $C_{1-4}$ alkyl-substituted styrene, such as 2-methylstyrene, 3-methylstyrene, α-methylstyrene, 2,4-dimethylstyrene, 2,4,6-trimethylstyrene and stilbene, 2,4-diisopropylstyrene, 4-tert-butylstyrene, vinyl benzyl dimethylamine, (4-vinylbenzyl) dimethyl aminoethyl ether, N,N-dimethylaminoethyl styrene, tert-butoxystyrene, vinylpyridine, 1,2-divinylbenzene, 1,3-divinylbenzene and 1,4-divinylbenzene. Suitable acrylic monomers include acrylonitrile, acrylates such as acrylic acid, methyl acrylate, ethyl acrylate, propyl acrylate and butyl acrylate, and methacrylates such as methyl methacrylate, ethyl methacrylate, propyl methacrylate and butyl methacrylate.

The living anionic elastomeric polymer may be a random or block copolymer.

In accordance with the present invention, the content of 1,2-added butadiene in the living anionic elastomeric polymer is from 2% to less than 10%, based on the polybutadiene fraction of the polymer (based on either weight or moles of butadiene repeating units). 1,2-Added butadiene is also referred to as "1,2-bonds" or "vinyl bonds" in this specification. In a preferred embodiment, the content of vinyl bonds in the polybutadiene fraction is from 4 to 9%.

The copolymerization of the monomers may be accomplished as is well known in the art for anionic living type polymerization reactions. The polymerization temperature is typically from −50 to 250° C., preferably from 0 to 120° C., at atmospheric pressure, sub-atmospheric pressure or elevated pressure. Preferably, the polymerization is performed at an absolute pressure of from 0.01 to 500 MPa, more preferably from 0.01 to 10 MPa, and most preferably from 0.1 to 2 MPa. The polymerization is generally conducted batch-wise, continuously or semi-continuously. The polymerization process can be conducted in the form of a gas phase polymerization (e.g. in a fluidized bed or stirred bed reactor), solution polymerization, wherein the polymer formed is substantially soluble in the reaction mixture, suspension/slurry polymerization, wherein the polymer formed is substantially insoluble in the reaction medium, or bulk polymerization, in which an excess of monomer to be polymerized is used as the reaction medium.

The polymerization is typically initiated with an anionic initiator, such as, but not limited to, an organometal compound having at least one lithium, sodium or potassium atom and containing from 1 to about 20 carbon atoms. The organometal compound preferably has at least one lithium atom and is, for example, ethyl lithium, propyl lithium, n-butyl lithium, sec-butyl lithium, tert-butyl lithium, phenyl lithium, hexyl lithium, 1,4-dilithio-n-butane or 1,3-di(2-lithio-2-hexyl)benzene, preferably n-butyl lithium or sec-butyl lithium. The organometal initiator, in particular the organolithium initiator, may be used singly or as a combination of two or more thereof. The total amount of the organometal initiator(s), in particular the organolithium initiator(s), will be adjusted depending on the monomer and target molecular weight. Its total amount is typically from 0.05 to 5 mmol, preferably from 0.2 to 3 mmol per 100 grams of monomer.

Polar coordinator compounds are conventionally added to the polymerization mixture for serving as a randomizer component, thus adjusting the content of vinyl bonds in the conjugated diolefin portion of the polymer and, for example, influencing the distribution of aromatic vinyl monomers in a butadiene/isoprene-co-aromatic vinyl compound copolymer. For lowering the vinyl bond content in the conjugated diolefin portion of the polymer, it is suitable to increase the polymerization temperature and/or reduce or minimize the amount of compounds functioning as a polar coordinator compound or "randomizer component", or to completely avoid their use. Polar coordinator compounds include, for example, ether compounds, such as diethyl ether, di-n-butyl ether, ethylene glycol diethyl ether, ethylene glycol dibutyl ether, diethylene glycol dimethyl ether, propylene glycol dimethyl ether, propylene glycol diethyl ether, propylene glycol dibutyl ether, alkyl tetrahydrofuryl ethers, such as, methyl tetrahydrofuryl ether, ethyl tetrahydrofuryl ether, propyl tetrahydrofuryl ether, butyl tetrahydrofuryl ether, hexyl tetrahydrofuryl ether, octyl tetrahydrofuryl ether, tetrahydrofuran, 2,2-bis(tetrahydrofurfuryl)propane, bis(tetrahydrofurfuryl)formal, methyl ether of tetrahydrofurfuryl alcohol, ethyl ether of tetrahydrofurfuryl alcohol, butyl ether of tetrahydrofurfuryl alcohol, α-methoxy tetrahydrofuran, dimethoxybenzene and dimethoxyethane, and tertiary amine compounds, such as butyl ether of triethylamine, pyridine, N,N,N',N'-tetramethyl ethylenediamine, dipiperidinoethane, methyl ether of N,N-diethyl ethanolamine, ethyl ether of N,N-diethyl ethanolamine and N,N-diethyl ethanolamine. Other polar coordinator compounds include oligomeric oxolanyl alkane as disclosed in U.S. Pat. Nos. 6,790,921 and 6,664,328. The polar coordinator compound(s) will typically be added in a total molar ratio relative to the initiator compound of not more than 10:1 (including the case of no polar coordinator compound at all), but typically from 0.1:1 to 8:1, preferably from 0.25:1 to about 6:1, and more preferably from 0.5:1 to 4:1.

The polymerization can optionally include accelerators to increase the reactivity of the initiator, to randomly arrange aromatic vinyl compounds introduced into the polymer, or to provide a single chain of aromatic vinyl compounds, thus influencing the distribution of aromatic vinyl monomers in a living anionic elastomeric copolymer. Examples of accelerators include sodium alkoxides or sodium phenoxides and potassium alkoxides or potassium phenoxides, preferably potassium alkoxides or potassium phenoxides, such as potassium isopropoxide, potassium t-butoxide, potassium t-amyloxide, potassium n-heptyloxide, potassium benzyloxide, potassium phenoxide; potassium salts of carboxylic acids, such as isovaleric acid, caprylic acid, lauric acid, palmitic acid, stearic acid, oleic acid, linolenic acid, benzoic acid, phthalic acid and 2-ethyl hexanoic acid; potassium salts of organic sulfonic acids, such as dodecyl benzenesulfonic acid, tetradecyl benzenesulfonic acid, hexadecyl benzenesulfonic acid and octadecyl benzenesulfonic acid; and potassium salts of organic phosphorous acids, such as diethyl phosphite, diisopropyl phosphite, diphenyl phosphite, dibutyl phosphite, and dilauryl phosphite. Such accelerator compounds may be added in a total amount of from 0.005 to 0.5 mol per 1.0 gram atom equivalent of lithium initiator. If less than 0.005 mol is added, a sufficient effect is not typically achieved. On the other hand, if the amount of the accelerator compound is more than about 0.5 mol, the productivity and efficiency of the chain end modification reaction can be significantly reduced.

An alkali metal alkoxide compound may also be added together with the polymerization initiator for increasing the polymerization reactivity. The alkali metal alkoxide compound can be prepared by reacting an alcohol and an organic alkali metal compound. The reaction may be carried out in a hydrocarbon solvent in the presence of monomers, such as conjugated diolefin monomers and aromatic vinyl monomers, prior to the copolymerization of the monomers. Alkali metal alkoxide compounds can be exemplified by alkali metal alkoxides of tetrahydrofurfuryl alcohol, N,N-dimethyl ethanolamine, N,N-diethyl ethanolamine, 1-piperazine ethanolamine and the like. An organic alkali metal compound, preferably an organolithium compound such as ethyllithium, propyllithium, n-butyllithium, sec-butyllithium, tert-butyllithium, hexyllithium and mixtures of two or more thereof, can be used as a reactant together with an alcohol compound to prepare an alkali metal alkoxide. N-butyllithium and sec-butyllithium are preferred organolithium compounds. The molar ratio of the alcohol compound to the organolithium compound should be from 1:0.7 to 1:5.0, preferably from 1:0.8 to 1:2.0, and more preferably from 1:0.9 to 1:1.2. If the molar ratio of the organolithium compound to the alcohol compound is more than 5.0, the effect on improvement of tensile strength, abrasion resistance and hysteresis may be compromised. In contrast, a molar ratio of the organolithium compound to the alcohol compound of less than 0.8 may decrease the polymerization rate and significantly decrease productivity, thus giving rise to low efficiency of the modified coupling reaction as well as the chain end modification reaction.

For further controlling the polymer molecular weight and polymer properties, a coupling agent ("linking agent") may be used. For example, a tin halide such as a tin tetrahalide, a tin trihalide and a tin dihalide, a silicon halide such as a silicon tetrahalide, a silicon trihalide and a silicon dihalide, a tin alkoxide, a silicon alkoxide or a mixture of two or more thereof can be added to the polymerization reaction. Such coupling agents include tin tetrachloride, tin tetrabromide, tin tetrafluoride, tin tetraiodide, silicon tetrachloride, silicon tetrabromide, silicon tetrafluoride and silicon tetraiodide. Polymers coupled with tin or silicon tetrahalides have a maximum of four arms (or four coupled polymer chains), while tin and silicon trihalides provide a maximum of three arms, and tin and silicon dihalides provide a maximum of two arms in the coupled polymer. Coupling agents also include hexahalo disilanes and hexahalo disiloxanes, resulting in a coupled polymer with a maximum of six arms. Specific tin halide and silicon halide coupling agents include $SnCl_4$, $R_3SnCl$, $R_2SnCl_2$, $R—SnCl_3$, $SiCl_4$, $R_3SiCl$, $R_2SiCl_2$, $R—SiCl_3$, $Cl_3Si—SiCl_3$, $Cl_3Si—O—SiCl_3$, $Cl_3Sn—SnCl_3$ and $Cl_3Sn—O—SnCl_3$, wherein R is $C_1$-$C_{18}$ alkyl, $C_7$-$C_{18}$ alkylaryl, $C_7$-$C_{18}$ arylalkyl and $C_6$-$C_{18}$ aryl. Specific tin alkoxide and silicon alkoxide coupling agents include $Sn(OMe)_4$, $Si(OMe)_4$, $Sn(OEt)_4$ and $Si(OEt)_4$. The most preferred coupling agents are $SnCl_4$, $SiCl_4$, $Sn(OMe)_4$ and $Si(OMe)_4$.

A combination of a tin-containing coupling compound and a silicon-containing coupling compound as defined above can optionally be used to couple the polymer, which may result in improved properties for tire rubbers, such as reduced hysteresis, especially for tire tread polymer compositions which contain both silica and carbon black. In such cases, the molar ratio of the tin-containing coupling compound to the silicon-containing coupling compound will normally be within the range of from 20:80 to 95:5, more typically from 40:60 to 90:10 and preferably from 60:40 to 85:15.

The total amount of coupling agents used will influence the Mooney viscosity of the coupled polymer and is typically in the range of from 0.01 to 4.5 milliequivalents per 100 grams of the elastomeric polymer, for example 0.01 to about 1.5 milliequivalents per 100 grams of polymer. Larger quantities of coupling agents tend to produce polymers containing terminally reactive groups or insufficient coupling degree. Between zero and less than one equivalent of tin and/or silicon coupling group per equivalent of lithium initiator can be used to enable subsequent functionalization of the remaining living polymer fraction. For instance, if a tin or silicon tetrachloride or a mixture thereof is used as the coupling agent, between 0 and less than 1.0 mol, preferably between 0 and 0.8 mol and more preferably between 0 and 0.6 mol of coupling agent can be used for every 4 moles of live lithium polymer chain ends.

Where an asymmetrical coupling is desired, the addition of the coupling agent will be carried out in a continuous manner. The continuous addition of the coupling agent is normally carried out in a reaction zone which is separate from the zone in which the bulk of the polymerization is taking place. The coupling agent can be added to the polymerization reaction in a hydrocarbon solvent, such as cyclohexane, and will typically be added after a high degree of monomer conversion has already taken place. For example, the coupling agent can be added at a monomer conversion of at least about 85%, preferably at least about 90%.

For solution-based polymerization processes, the polymerization is conducted in a suitable solvent, dispersing agent or diluent. Non-coordinating, inert liquids are preferred, including, but not limited to, straight and branched-chain hydrocarbons such as propane, butane, isobutane, pentane, hexane, heptane, pentamethyl heptane and octane, cyclic and alicyclic hydrocarbons, such as cyclohexane, cycloheptane, methylcyclohexane and methylcycloheptane, aromatic and alkyl-substituted aromatic compounds, such as benzene, toluene and xylene, mineral oil fractions, such as light or regular petrol, naphtha, kerosene and gas oil, fluorinated hydrocarbon liquids, such as perfluorinated $C_{4-10}$ alkanes, and mixtures of two or more thereof. Further suitable solvents include liquid olefins, which may act as (co) monomers in the polymerization process, such as propylene, 1-butene, 1-pentene, cyclopentene, 1-hexene, 3-methyl-1-pentene, 4-methyl-1-pentene, butadiene, isoprene, 1,4-hexadiene, 1,7-octadiene, 1-octene, 1-decene, styrene, divinylbenzene, ethylidenenorbornene, allylbenzene, 2-methylstyrene, 3-methylstyrene, 4-methylstyrene, 4-vinylcyclohexene, vinylcyclohexane and mixtures of two or more thereof.

Modifying Compound (I)

The modifying compound of formula (I) is preferably defined as follows:

$(R''O)_x(R)_ySi-R'-S-SiR_3$   Formula (I)

wherein R is independently $C_1$-$C_{16}$ alkyl or benzyl; R'' is $C_1$-$C_4$ alkyl; R' is selected from $C_6$-$C_{18}$ aryl, $C_7$-$C_{50}$ alkylaryl, $C_1$-$C_{50}$ alkyl and $C_2$-$C_{50}$ dialkylether (i.e. alkyl-O-alkyl), wherein each group is optionally substituted with one or more groups selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl)amino, tris($C_1$-$C_7$ hydrocarbyl)silyl and $C_1$-$C_{12}$ thioalkyl; x is an integer selected from 1, 2 and 3; y is an integer selected from 0, 1 and 2; and x+y=3.

In a preferred embodiment, R is independently selected from $C_1$-$C_5$ alkyl and R' is $C_1$-$C_5$ alkyl.

Specific preferred examples of the modifying compound of formula (I) include: $(MeO)_3Si-(CH_2)_3-S-SiMe_3$, $(EtO)_3Si-(CH_2)_3-S-SiMe_3$, $(PrO)_3Si-(CH_2)_3-S-SiMe_3$, $(BuO)_3Si-(CH_2)_3-S-SiMe_3$, $(MeO)_3Si-(CH_2)_2-S-SiMe_3$, $(EtO)_3Si-(CH_2)_2-S-SiMe_3$, $(PrO)_3Si-(CH_2)_2-S-SiMe_3$, $(BuO)_3Si-(CH_2)_2-S-SiMe_3$, $(MeO)_3Si-CH_2-S-SiMe_3$, $(EtO)_3Si-CH_2-S-SiMe_3$, $(PrO)_3Si-CH_2-S-SiMe_3$, $(BuO)_3Si-CH_2-S-SiMe_3$, $(MeO)_3Si-CH_2-CMe_2-CH_2-S-SiMe_3$, $(EtO)_3Si-CH_2-CMe_2-CH_2-S-SiMe_3$, $(PrO)_3Si-CH_2-CMe_2-CH_2-S-SiMe_3$, $(BuO)_3Si-CH_2-CMe_2-CH_2-S-SiMe_3$, $(MeO)_3Si-CH_2-C(H)Me-CH_2-S-SiMe_3$, $(EtO)_3Si-CH_2-C(H)Me-CH_2-S-SiMe_3$, $(PrO)_3Si-CH_2-C(H)Me-CH_2-S-SiMe_3$, $(BuO)_3Si-CH_2-C(H)Me-CH_2-S-SiMe_3$, $(MeO)_2(Me)Si-(CH_2)_3-S-SiMe_3$, $(EtO)_2(Me)Si-(CH_2)_3-S-SiMe_3$, $(PrO)_2(Me)Si-(CH_2)_3-S-SiMe_3$, $(BuO)_2(Me)Si-(CH_2)_3-S-SiMe_3$, $(MeO)_2(Me)Si-(CH_2)_2-S-SiMe_3$, $(EtO)_2(Me)Si-(CH_2)_2-S-SiMe_3$, $(PrO)_2(Me)Si-(CH_2)_2-S-SiMe_3$, $(BuO)_2(Me)Si-(CH2)_2-S-SiMe_3$, $(MeO)_2(Me)Si-CH_2-S-SiMe_3$, $(EtO)_2(Me)Si-CH_2-S-SiMe_3$, $(PrO)_2(Me)Si-CH_2-S-SiMe_3$, $(BuO)_2(Me)Si-CH_2-S-SiMe_3$, $(MeO)_2(Me)Si-CH_2-CMe_2-CH_2-S-SiMe_3$, $(EtO)_2(Me)Si-CH_2-CMe_2-CH_2-S-SiMe_3$, $(PrO)_2(Me)Si-CH_2-CMe_2-CH_2-S-SiMe_3$, $(BuO)_2(Me)Si-CH_2-CMe_2-CH_2-S-SiMe_3$, $(MeO)_2(Me)Si-CH_2-C(H)Me-CH_2-S-SiMe_3$, $(EtO)_2(Me)Si-CH_2-C(H)Me-CH_2-S-SiMe_3$, $(PrO)_2(Me)Si-CH_2-C(H)Me-CH_2-S-SiMe_3$, $(BuO)_2(Me)Si-CH_2-C(H)Me-CH_2-S-SiMe_3$, $(MeO)(Me)_2Si-(CH2)_3-S-SiMe_3$, $(EtO)(Me)_2Si-(CH2)3-S-SiMe3$, $(PrO)Me)2Si-(CH2)3-S-SiMe3$, $(BuO)(Me)2Si-(CH_2)_3-S-SiMe_3$, $(MeO)(Me)_2Si-(CH_2)_2-S-SiMe_3$, $(EtO)(Me)_2Si-(CH_2)_2-S-SiMe_3$, $(PrO)(Me)_2Si-(CH_2)_2-S-SiMe_3$, $(BuO)(Me)_2Si-(CH_2)_2-S-SiMe_3$, $(MeO)(Me)_2Si-CH_2-S-SiMe_3$, $(EtO)(Me)_2Si-CH_2-S-SiMe_3$, $(PrO)(Me)_2Si-CH_2-S-SiMe_3$, $(BuO)(Me)_2Si-CH_2-S-SiMe_3$, $(MeO)(Me)_2Si-CH_2-CMe_2-CH_2-S-SiMe_3$, $(EtO)(Me)_2Si-CH_2-CMe_2-CH_2-S-SiMe_3$, $(PrO)(Me)_2Si-CH_2-CMe_2-CH_2-S-SiMe_3$, $(BuO)(Me)_2Si-CH_2-CMe_2-CH_2-S-SiMe_3$, $(MeO)(Me)_2Si-CH_2-C(H)Me-CH_2-S-SiMe_3$, $(EtO)(Me)_2Si-CH_2-C(H)Me-CH_2-S-SiMe_3$, $(PrO)(Me)_2Si-CH_2-C(H)Me-CH_2-S-SiMe_3$, $(BuO)(Me)_2Si-CH_2-C(H)Me-CH_2-S-SiMe_3$, $(MeO)_3Si-(CH_2)_3-S-SiEt_3$, $(EtO)_3Si-(CH_2)_3-S-SiEt_3$, $(PrO)_3Si-(CH_2)_3-S-SiEt_3$, $(BuO)_3Si-(CH_2)_3-S-SiEt_3$, $(MeO)_3Si-(CH_2)_2-S-SiEt_3$, $(EtO)_3Si-(CH_2)_2-S-SiEt_3$, $(PrO)_3Si-(CH_2)_2-S-SiEt_3$, $(BuO)_3Si-(CH_2)_2-S-SiEt_3$, $(MeO)_3Si-CH_2-S-SiEt_3$, $(EtO)_3Si-CH_2-S-SiEt_3$, $(PrO)_3Si-CH_2-S-SiEt_3$, $(BuO)_3Si-CH_2-S-SiEt_3$, $(MeO)_3Si-CH_2-CMe_2-CH_2-S-SiEt_3$, $(EtO)_3Si-CH_2-CMe_2-CH_2-S-SiEt_3$, $(PrO)_3Si-CH_2-CMe_2-CH_2-S-SiEt_3$, $(BuO)_3Si-CH_2-CMe_2-CH_2-S-SiEt_3$, $(MeO)_3Si-CH_2-C(H)Me-CH_2-S-SiEt_3$, $(EtO)_3Si-CH_2-C(H)Me-CH_2-S-SiEt_3$, $(PrO)_3Si-CH_2-C(H)Me-CH_2-S-SiEt_3$, $(BuO)_3Si-CH_2-C(H)Me-CH_2-S-SiEt_3$, $(MeO)_2(Me)Si-(CH_2)_3-S-SiEt_3$, $(EtO)_2(Me)Si-(CH_2)_3-S-SiEt_3$, $(PrO)_2(Me)Si-(CH_2)_3-S-SiEt_3$, $(BuO)_2(Me)Si-(CH_2)_3-S-SiEt_3$, $(MeO)_2(Me)Si-(CH_2)_2-S-SiEt_3$, $(EtO)_2(Me)Si-(CH_2)_2-S-SiEt_3$, $(PrO)_2(Me)Si-(CH_2)_2-S-SiEt_3$, $(BuO)_2(Me)Si-(CH_2)_2-S-SiEt_3$, $(MeO)_2(Me)Si-CH_2-S-SiEt_3$, $(EtO)_2(Me)Si-CH_2-S-SiEt_3$, $(PrO)_2(Me)Si-CH_2-S-SiEt_3$, $(BuO)_2(Me)Si-CH_2-S-SiEt_3$, $(MeO)_2(Me)Si-CH_2-CMe_2-CH_2-S-SiEt_3$, $(EtO)_2(Me)Si-CH_2-CMe_2-CH_2-S-SiEt_3$, $(PrO)(Me)Si-CH_2-CMe_2-CH_2-S-SiEt_3$, $(BuO)_2(Me)Si-CH_2-CMe_2-CH_2-S-SiEt_3$, $(MeO)_2(Me)Si-CH_2-C(H)Me-CH_2-S-SiEt_3$, $(EtO)_2(Me)Si-CH_2-C(H)Me-CH_2-S-SiEt_3$, $(PrO)_2(Me)Si-CH_2-C(H)Me-CH_2-S-SiEt_3$, $(BuO)_2(Me)Si-CH_2-C(Hi)Me-CH_2-S-SiEt_3$, $(MeO)(Me)_2Si-(CH_2)_3-S-SiEt_3$, $(EtO)(Me)_2Si-(CH_2)_3-S-SiEt_3$, $(PrO)(Me)_2Si-(CH_2)_3-S-SiEt_3$, $(BuO)(Me)_2Si-(CH_2)_3-S-SiEt_3$, $(MeO)(Me)_2Si-(CH_2)_2-S-SiEt_3$, $(EtO)(Me)_2Si-(CH_2)_2-S-SiEt_3$, $(PrO)(Me)_2Si-(CH_2)_2-S-SiEt_3$, $(BuO)(Me)_2Si-(CH_2)_2-S-SiEt_3$, $(MeO)(Me)_2Si-CH_2-S-SiEt_3$, $(EtO)(Me)_2Si-CH_2-S-SiEt_3$, $(PrO)(Me)_2Si-CH_2-S-SiEt_3$, $(BuO)(Me)_2Si-CH_2-S-SiEt_3$, $(MeO)(Me)_2Si-CH_2-CMe_2-CH_2-S-SiEt_3$, $(EtO)(Me)_2Si-CH_2-CMe_2-CH_2-S-SiEt_3$, $(PrO)(Me)_2Si-CH_2-CMe_2-CH_2-S-SiEt_3$, $(BuO)(Me)_2Si-CH_2-CMe_2-CH_2-S-SiEt_3$, $(MeO)(Me)_2Si-CH_2-C(H)Me-CH_2-S-SiEt_3$, $(EtO)(Me)_2Si-CH_2-C(H)Me-CH_2-S-SiEt_3$, $(PrO)(Me)_2Si-CH_2-C(H)Me-CH_2-S-SiEt_3$, $(BuO)(Me)_2Si-CH_2-C(H)Me-CH_2-S-SiEt_3$, $(MeO)_3Si-(CH_2)_3-S-SiMe_2{}^tBu$, $(EtO)_3Si-(CH_2)_3-S-SiMe_2{}^tBu$, $(PrO)_3Si-(CH_2)S-S-SiMe^tBu$, $(BuO)_3Si-(CH_2-S-SiMe_2{}^tBu$, $(MeO)_3Si-(CH_2)_2-S-SiMe_2{}^tBu$, $(EtO)_3Si-(CH_2)_2-S-SiMe_2{}^tBu$, $(PrO)_3Si-(CH_2)_2-S-SiMe_2{}^tBu$, $(BuO)_3Si-(CH_2)_2-S-SiMe_2{}^tBu$, $(MeO)_3Si-CH_2-S-SiMe_2{}^tBu$, $(EtO)_3Si-CH_2-S-SiMe_2{}^tBu$, $(PrO)_3Si-CH_2-S-SiMe_2{}^tBu$, $(BuO)_3Si-CH_2-S-SiMe_2{}^tBu$, $(MeO)_3Si-CH_2-CMe_2-CH_2-S-SiMe_2{}^tBu$, $(EtO)_3Si-CH_2-CMe_2-CH_2-S-SiMe_2{}^tBu$, $(PrO)_3Si-CH_2-CMe_2-CH_2-S-SiMe_2{}^tBu$, $(BuO)_3Si-CH_2-CMe_2-CH_2-S-SiMe_2{}^tBu$, $(MeO)_3Si-CH_2-C(H)Me-CH_2-S-SiMe_2{}^tBu$, $(EtO)_3Si-CH_2-C(H)Me-CH_2-S-SiMe_2{}^tBu$, $(PrO)_3Si-CH_2-C(H)Me-CH_2-S-SiMe_2{}^tBu$, $(BuO)_3Si-CH_2-C(H)Me-CH_2-S-SiMe_2{}^tBu$, $(MeO)_2(Me)Si-(CH_2)_3-S-SiMe_2{}^tBu$, $(EtO)_2(Me)Si-(CH_2)_2-S-SiMe_2{}^tBu$, $(PrO)_2(Me)Si-(CH_2)_3-S-SiMe_2{}^tBu$, $(BuO)_2(Me)Si-(CH_2)_3-S-SiMe_2{}^tBu$, $(MeO)_2(Me)Si-(CH_2)_2-S-SiMe_2{}^tBu$, $(EtO)_2(Me)Si-(CH_2)_2-S-SiMe_2{}^tBu$, $(PrO)_2(Me)Si-(CH_2)_2-S-SiMe_2{}^tBu$, $(BuO)_2(Me)Si-(CH_2)_2-S-SiMe_2{}^tBu$, $(MeO)_2(Me)Si-CH_2-S-SiMe_2{}^tBu$, $(EtO)_2(Me)Si-CH_2-S-SiMe_2{}^tBu$, $(PrO)_2(Me)Si-CH_2-S-SiMe_2{}^tBu$, $(BuO)_2(Me)Si-CH_2-S-SiMe_2{}^tBu$, $(MeO)_2(Me)Si-CH_2-CMe_2-CH_2-S-SiMe_2{}^tBu$, $(EtO)_2(Me)Si-CH_2-CMe_2-CH_2-S-SiMe_2{}^tBu$, $(PrO)_2(Me)Si-CH_2-CMe_2-CH_2-S-SiMe_2{}^tBu$, $(BuO)_2(Me)Si-CH_2-CMe_2-CH_2-

S—SiMe₂ᵗBu, (MeO)₂(Me)Si—CH₂—C(H)Me-CH₂—S—SiMe₂ᵗBu, (EtO)₂(Me)Si—CH₂—C(H)Me-CH₂—S—SiMe₂ᵗBu, (PrO)₂(Me)Si—CH₂—C(H)Me-CH₂—S—SiMe₂ᵗBu, (BuO)₂(Me)Si—CH₂—C(H)Me-CH₂—S—SiMe₂ᵗBu, (MeO)(Me)₂Si—(CH₂)₃—S—SiMe₂ᵗBu, (EtO)(Me)₂Si—(CH₂)₃—S—SiMe₂ᵗBu, (PrO)(Me)₂Si—(CH₂)₃—S—SiMe₂ᵗBu, (BuO)(Me)₂Si—(CH₂)₃—S—SiMe₂ᵗBu, (MeO)(Me)₂Si—(CH₂)₂—S—SiMe₂ᵗBu, (EtO)(Me)₂Si—(CH₂)₂—S—SiMe₂ᵗBu, (PrO)(Me)₂Si—(CH₂)₂—S—SiMe₂ᵗBu, (BuO)(Me)₂Si—(CH₂)₂—S—SiMe₂ᵗBu, (MeO)(Me)₂Si—CH₂—S—SiMe₂ᵗBu, (EtO)(Me)₂Si—CH₂—S—SiMe₂ᵗBu, (PrO)(Me)₂Si—CH₂—S—SiMe₂ᵗBu, (BuO)(Me)₂Si—CH₂—S—SiMe₂ᵗBu, (MeO)(Me)₂Si—CH₂—CMe₂-CH₂—S—SiMe₂ᵗBu, (EtO)(Me)₂Si—CH₂—CMe₂-CH₂—S—SiMe₂ᵗBu, (PrO)(Me)₂Si—CH₂—CMe₂-CH₂—S—SiMe₂ᵗBu, (BuO)(Me)₂Si—CH₂—CMe₂-CH₂—S—SiMe₂ᵗBu, (MeO)(Me)₂Si—CH₂—C(H)Me-CH₂—S—SiMe₂ᵗBu, (EtO)(Me)₂Si—CH₂—C(H)Me-CH₂—S—SiMe₂ᵗBu, (PrO)(Me)₂Si—CH₂—C(H)Me-CH₂—S—SiMe₂ᵗBu and (BuO)(Me)₂Si—CH₂—C(H)Me-CH₂—S—SiMe₂ᵗBu.

The modifying compounds of formula (I) may be prepared by reacting a sulfur-containing compound of the following formula (II):

(R″O)ₓ(R)ᵧSi—R′—S—H    Formula (II)

wherein R, R′, R″, x and y have the same meaning as defined with respect to formula (I), with a compound of the following formula (C):

QSiR₃    Formula (C), wherein Q is fluorine, chlorine or bromine and R has the same meaning as defined with respect to formula (I).

The modifying compounds of formula (I) include the sulfanylsilane compounds described in U.S. Pat. No. 6,229,036, the content of which is incorporated herein by reference. Among the sulfanylsilane compounds disclosed therein, those without halogens are preferred.

Modifying Compounds (1) and (2)

In one embodiment of the modifying compounds of formulas (1) and (2), $R^1$ and $R^{13}$ are independently selected from $C_1$-$C_4$ alkyl; $R^3$, $R^{10}$, $R^{11}$ and $R^{12}$ are independently selected from $C_1$-$C_{16}$ alkyl and benzyl; and $R^4$ and $R^9$ are independently selected from $C_1$-$C_{16}$ alkyl, $C_6$-$C_{16}$ aryl and $C_7$-$C_{16}$ alkylaryl.

In one embodiment, $R^4$ and $R^9$ are independently selected from linear $C_1$-$C_{10}$ alkyl, cyclic $C_6$-$C_{12}$ alkyl, $C_6$-$C_{15}$ aryl and a $C_7$-$C_{12}$ alkylaryl, such as —CH₂— (methylene), —(CH₂)₂— (ethylidene), —(CH₂)₃— (propylidene), —(CH₂)₄— (butylidene), —(CH₂)—C(CH₃)₂—CH₂— (i-pentylidene), —CH₂—C₆H₄—CH₂— (xylidene) and —C₆H₄—C(CH₃)₂—C₆H₄—.

In one embodiment, $R^1$, $R^3$, $R^{10}$, $R^{11}$, $R^{12}$ and $R^{13}$ are independently selected from CH₃-(methyl), CH₃—CH₂— (ethyl), CH₃—(CH₂)₂— (propyl), (CH₃)₂—(CH)— (propyl), CH₃—(CH₂)₃— (n-butyl) and CH₃—C(CH₃)₂— (tert-butyl).

In one embodiment, R′ and $R^{13}$ are independently selected from $C_1$-$C_3$ alkyl, preferably methyl, ethyl, n-propyl and i-propyl, and $R^3$, $R^{10}$, $R^{11}$ and $R^{12}$ are independently selected from linear $C_1$-$C_6$ alkyl and cyclic $C_6$-$C_{12}$ alkyl.

Specific examples of modifying compounds of formula (1) include (MeO)₃Si—(CH₂)S—S—SiMe₃, (EtO)₃Si—(CH₂)₃—S—SiMe₃, (PrO)₃Si—(CH₂)₃—S—SiMe₃, (BuO)₃Si—(CH₂)₃—S—SiMe₃, (MeO)₃Si—(CH₂)₂—S—SiMe₃, (EtO)₃Si—(CH₂)₂—S—SiMe₃, (PrO)₃Si—(CH₂)₂—S—SiMe₃, (BuO)₃Si—(CH₂)₂—S—SiMe₃, (MeO)₃Si—CH₂—S—SiMe₃, (EtO)₃Si—CH₂—S—SiMe₃, (PrO)₃Si—CH₂—S—SiMe₃, (BuO)₃Si—CH₂—S—SiMe₃, (MeO)₃Si—CH₂—CMe₂-CH₂—S—SiMe₃, (EtO)₃Si—CH₂—CMe₂-CH₂—S—SiMe₃, (PrO)₃Si—CH₂—CMe₂-CH₂—S—SiMe₃, (BuO)₃Si—CH₂—CMe₂-CH₂—S—SiMe₃, (MeO)₃Si—CH₂—C(H)Me-CH₂—S—SiMe₃, (EtO)₃Si—CH₂—C(H)Me-CH₂—S—SiMe₃, (PrO)₃Si—CH₂—C(H)Me-CH₂—S—SiMe₃, (BuO)₃Si—CH₂—C(H)Me-CH₂—S—SiMe₃, (MeO)₃Si—(CH2)₃-S—SiEt₃, (EtO)₃Si—(CH₂)₃—S—SiEt₃, (PrO)₃Si—(CH₂)₃—S—SiEt₃, (BuO)₃Si—(CH₂)₃—S—SiEt₃, (MeO)₃Si—(CH₂)₂—S—SiEt₃, (EtO)₃Si—(CH₂)₂—S—SiEt₃, (PrO)₃Si—(CH₂)₂—S—SiEt₃, (BuO)₃Si—(CH₂)₂—S—SiEt₃, (MeO)₃Si—CH₂—S—SiEt₃, (EtO)₃Si—CH₂—S—SiEt₃, (PrO)₃Si—CH₂—S—SiEt₃, (BuO)₃Si—CH₂—S—SiEt₃, (MeO)₃Si—CH₂—CMe₂-CH₂—S—SiEt₃, (EtO)₃Si—CH₂—CMe₂-CH₂—S—SiEt₃, (PrO)₃Si—CH₂—CMe₂-CH₂—S—SiEt₃, (BuO)₃Si—CH₂—CMe₂-CH₂—S—SiEt₃, (MeO)₃Si—CH₂—C(H)Me-CH₂—S—SiEt₃, (EtO)₃Si—CH₂—C(H)Me-CH₂—S—SiEt₃, (PrO)₃Si—CH₂—C(H)Me-CH₂—S—SiEt₃ and (BuO)₃Si—CH₂—C(H)Me-CH₂—S—SiEt₃.

Specific examples of modifying compounds of formula (2) include (MeO)₃Si—(CH₂)—N(SiMe₃)₂, (EtO)₃Si—(CH₂)₃—N(SiMe₃)₂, (PrO)₃Si—(CH₂)₃—N(SiMe₃)₂, (BuO)₃Si—(CH₂)₃—N(SiMe₃)₂, (MeO)₃Si—(CH₂)₂—N(SiMe₃)₂, (EtO)₃Si—(CH₂)₂—N(SiMe₃)₂, (PrO)₃Si—(CH₂)₂—N(SiMe₃)₂, (BuO)₃Si—(CH₂)₂—N(SiMe₃)₂, (MeO)₃Si—CH₂—N(SiMe₃)₂, (EtO)₃Si—CH2-N(SiMe₃)₂, (PrO)₃Si—CH₂—N(SiMe₃)₂, (BuO)₃Si—CH₂—N(SiMe₃)₂, (MeO)₃Si—CH₂—CMe₂-CH₂—N(SiMe₃)₂, (EtO)₃Si—CH₂—CMe₂-CH₂—N(SiMe₃)₂, (PrO)₃Si—CH₂—CMe₂-CH₂—N(SiMe₃)₂, (BuO)₃Si—CH₂—CMe₂-CH₂—N(SiMe₃)₂, (MeO)₃Si—CH₂—C(H)Me-CH₂—N(SiMe₃)₂, (EtO)₃Si—CH₂—C(H)Me-CH₂—N(SiMe₃)₂, (PrO)₃Si—CH₂—C(H)Me-CH₂—N(SiMe₃)₂, (BuO)₃Si—CH₂—C(H)Me-CH₂—N(SiMe₃)₂,

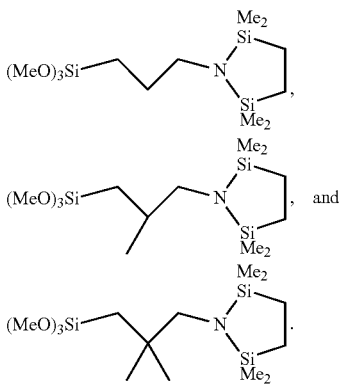

The modifying compound of formula (1) may be prepared by reacting a sulfur-containing compound of formula (7):

(R¹O)₃Si—R⁴—SH    Formula (7)

wherein $R^1$ and $R^4$ have the same meaning as defined with respect to formula (1), with a compound of formula (8):

QSiR³₃    Formula (8)

wherein Q is fluorine, chlorine or bromine. Preferably, a base such as triethyl amine is used in the reaction for quenching the hydrohalic acid of formula HQ formed.

The modifying compound of formula (1) may be also prepared by reacting a sulfur-containing compound of formula (9):

(R¹O)₃Si—R⁴—S-M    Formula (9)

wherein M is lithium, sodium or potassium and $R^1$ and $R^4$ have the same meaning as defined with respect to formula (1), with a compound of formula (8).

The preparation of modifying compounds of formula (2) is conventional in this art, and can be carried out as described in, e.g., WO2003/029299 (corresponding to US2004/0254301 and EP 1 457 501).

The modification reaction with the modifying compound of formula (1) is believed to result in a modified elastomeric polymer represented by the following formula (P1):

$$(D)_z(R^1O)_{3-z}Si-R^4-S-SiR^3_3 \quad \text{Formula (P1)}$$

wherein D is an elastomeric polymer chain; z is an integer selected from 1, 2 and 3; and $R^1$, $R^3$ and $R^4$ are as defined with respect to formula (1).

Contact with moisture is believed to result in a modified elastomeric polymer represented by the following formula (P3):

$$(D)_z(HO)_{3-z}Si-R^4-S-SiR^3_3 \quad \text{Formula (P3)}$$

wherein D is an elastomeric polymer chain; z is an integer selected from 1, 2 and 3; and $R^3$ and $R^4$ are as defined with respect to formula (1).

Use of Modifying Compounds (I), (1) and (2)

The modifying compounds of formulas (I), (1) and (2) may be added intermittently (at regular or irregular intervals) or continuously during the polymerization, but are preferably added once the conversion rate of the polymerization has reached more than 80%, and more preferably at a conversion rate of more than 90%. Preferably, a substantial amount of the polymer chain ends are not terminated prior to the reaction with the modifying compound; that is, the living polymer chain ends are present and capable of reacting with the modifying compound in a polymer modification reaction. The modification reaction may be carried out before, after or during the addition of a coupling agent (if used). Preferably, the modification reaction is completed after the addition of the coupling agent (if used). In some embodiments, more than 10% of the polymer chain ends are reacted with a coupling agent prior to addition of the modifying compound. In some embodiments, no coupling agent is used and the living polymer chains are reacted with the modifying compound. In the course of the modification reaction, one or more polymer chains can react with the modifying compound. As result, one or more polymer chains are linked to the functionality derived from the modifying compound.

The modifying compound may be added directly into the polymer solution without dilution; however, it may be beneficial to add the modifying compound in solution, for example in an inert solvent such as cyclohexane. The amount of modifying compound added to the polymerization varies depending upon the monomer species, modifying compound, reaction conditions and desired end properties of the modified elastomeric polymer, but is generally from 0.05 to 5 mol-equivalent, preferably from 0.1 to 2.0 mol-equivalent and most preferably from 0.2 to 1.5 mol-equivalent per mol-equivalent of alkali metal in the organic alkali metal compound used as initiator for the polymerization. The modification reaction may be carried out in a temperature range of from 0 to 150° C., preferably from 15 to 100° C., even more preferably from 25 to 80° C. There is no limitation for the duration of the functionalization reaction, however with respect to an economical polymerization process, the modification reaction is usually stopped about 10 to 60 minutes after the addition of the modifying compound.

Modifying Compounds (3) to (6)

Subsequent to the reaction with at least one of the modifying compounds of formulas (1) and (2), the polymer is further modified by reaction with at least one of the modifying compounds of formulas (3), (4), (5) and (6).

In one embodiment of the modifying compounds of formulas (3), (4), (5) and (6), $R^2$, $R^3$, $R^8$, $R^{10}$, $R^{11}$, $R^{12}$, $R^{14}$, $R^{16}$, $R^{17}$ and $R^{18}$ are independently selected from $C_1$-$C_{16}$ alkyl, such as $CH_3$— (methyl), $CH_3$—$CH_2$— (ethyl), $CH_3$— $(CH_2)_2$— (n-propyl), $(CH_3)_2$—(CH)— (i-propyl), $CH_3$—$(CH_2)_3$— (n-butyl) and $CH_3$—$C(CH_3)_2$— (tert-butyl), $R^1$ and $R^{13}$ are independently selected from $C_1$-$C_4$ alkyl, $R^5$, $R^6$, $R^7$, $R^{19}$, $R^{20}$ and $R^{21}$ are independently selected from hydrogen and $C_1$-$C_{16}$ alkyl, and $R^4$, $R^9$ and $R^{15}$ are independently selected from $C_1$-$C_{16}$ alkyl, in particular linear $C_1$-$C_{10}$ alkyl or cyclic $C_6$-$C_{12}$ alkyl, such as —$CH_2$— (methylene), —$(CH_2)_2$— (ethylidene), —$(CH_2)_3$— (propylidene), —$(CH_2)_4$— (butylidene) and —$(CH_2)$—$C(CH_3)_2$—$CH_2$— (i-pentylidene), $C_6$-$C_{15}$ aryl and $C_7$-$C_{16}$ alkylaryl, such as —$CH_2$—$C_6H_4$—$CH_2$— (xylidene) and —$C_6H_4$—$C(CH_3)_2$—$C_6H_4$—.

In one embodiment, $R^1$ and $R^{13}$ are independently selected from methyl, ethyl and propyl (including isomers), $R^2$, $R^3$, $R^{10}$, $R^{11}$, $R^{12}$, $R^{14}$, $R^{16}$, $R^{17}$ and $R^{18}$ are independently selected from linear $C_1$-$C_6$ alkyl, $R^5$, $R^6$, $R^7$, $R^8$, $R^{19}$, $R^{20}$ and $R^{21}$ are independently selected from hydrogen and linear $C_1$-$C_{15}$ alkyl, and $R^4$, $R^9$ and $R^{15}$ are independently selected from $C_1$-$C_{10}$ alkyl.

Examples of the modifying compounds of formula (3) include $(MeO)_2(Me)Si$—$(CH_2)_2$—$S$—$SiMe_3$, $(EtO)_2(Me)Si$—$(CH_2)_3$—$S$—$SiMe_3$, $(PrO)_2(Me)Si$—$(CH_2)_3$—$S$—$SiMe_3$, $(BuO)_2(Me)Si$—$(CH_2)_3$—$S$—$SiMe_3$, $(MeO)_2(Me)Si$—$(CH_2)_2$—$S$—$SiMe_3$, $(EtO)_2(Me)Si$—$(CH_2)_2$—$S$—$SiMe_3$, $(PrO)_2(Me)Si$—$(CH_2)_2$—$S$—$SiMe_3$, $(BuO)_2(Me)Si$—$(CH2)_2$-$S$—$SiMe_3$, $(MeO)_2(Me)Si$—$CH_2$—$S$—$SiMe_3$, $(EtO)_2(Me)Si$—$CH_2$—$S$—$SiMe_3$, $(PrO)_2(Me)Si$—$CH_2$—$S$—$SiMe_3$, $(BuO)_2(Me)Si$—$CH_2$—$S$—$SiMe_3$, $(MeO)_2(Me)Si$—$CH_2$—$CMe_2$-$CH_2$—$S$—$SiMe_3$, $(EtO)_2(Me)Si$—$CH_2$—$CMe_2$-$CH_2$—$S$—$SiMe_3$, $(PrO)_2(Me)Si$—$CH_2$—$CMe_2$-$CH_2$—$S$—$SiMe_3$, $(BuO)_2(Me)Si$—$CH_2$—$CMe_2$-$CH_2$—$S$—$SiMe_3$, $((MeO)_2(Me)Si$—$CH_2$—$C(H)Me$-$CH_2$—$S$—$SiMe_3$, $(EtO)_2(Me)Si$—$CH_2$—$C(H)Me$-$CH_2$—$S$—$SiMe_3$, $(PrO)_2(Me)Si$—$CH_2$—$C(H)Me$-$CH_2$—$S$—$SiMe_3$, $(BuO)_2(Me)Si$—$CH_2$—$C(H)Me$-$CH_2$—$S$—$SiMe_3$, $(MeO)(Me)_2Si$—$(CH_2)_3$—$S$—$SiMe_3$, $(EtO)(Me)_2Si$—$(CH_2)_3$—$S$—$SiMe_3$, $(PrO)(Me)_2Si$—$(CH_2)_3$—$S$—$SiMe_3$, $(BuO)(Me)_2Si$—$(CH_2)_3$—$S$—$SiMe_3$, $(MeO)(Me)_2Si$—$(CH_2)_2$—$S$—$SiMe_3$, $(EtO)(Me)_2Si$—$(CH_2)_2$—$S$—$SiMe_3$, $(PrO)(Me)_2Si$—$(CH_2)_2$—$S$—$SiMe_3$, $(BuO)(Me)_2Si$—$(CH_2)_2$—$S$—$SiMe_3$, $(MeO)(Me)_2Si$—$CH_2$—$S$—$SiMe_3$, $(EtO)(Me)_2Si$—$CH_2$—$S$—$SiMe_3$, $(PrO)(Me)_2Si$—$CH_2$—$S$—$SiMe_3$, $(BuO)(Me)_2Si$—$CH_2$—$S$—$SiMe_3$, $(MeO)(Me)_2Si$—$CH_2$—$CMe_2$-$CH_2$—$S$—$SiMe_3$, $(EtO)(Me)_2Si$—$CH_2$—$CMe_2$-$CH_2$—$S$—$SiMe_3$, $(PrO)(Me)_2Si$—$CH_2$—$CMe_2$-$CH_2$—$S$—$SiMe_3$, $(BuO)(Me)_2Si$—$CH_2$—$CMe_2$-$CH_2$—$S$—$SiMe_3$, $(MeO)(Me)_2Si$—$CH_2$—$C(H)Me$-$CH_2$—$S$—$SiMe_3$, $(EtO)(Me)_2Si$—$CH_2$—$C(H)Me$-$CH_2$—$S$—$SiMe_3$, $(PrO)(Me)_2Si$—$CH_2$—$C(H)Me$-$CH_2$—$S$—$SiMe_3$, $(BuO)(Me)_2Si$—$CH_2$—$C(H)Me$-$CH_2$—$S$—$SiMe_3$, $(MeO)_2(Me)Si$—$(CH_2)_3$—$S$—$SiEt_3$, $(EtO)_2(Me)Si$—$(CH_2)_3$—$S$—$SiEt_3$, $(PrO)_2(Me)Si$—$(CH_2)_3$—$S$—$SiEt_3$, $(BuO)_2(Me)Si$—$(CH_2)_3$—$S$—$SiEt_3$, $(MeO)_2(Me)Si$—$(CH_2)_2$—$S$—$SiEt_3$, $(EtO)_2(Me)Si$—$(CH_2)_2$—$S$—$SiEt_3$, $(PrO)_2(Me)Si$—$(CH_2)_2$—$S$—$SiEt_3$, $(BuO)_2(Me)Si$—$(CH_2)_2$—$S$—$SiEt_3$, $(MeO)_2(Me)Si$—$CH_2$—$S$—$SiEt_3$, $(EtO)_2(Me)Si$—$CH_2$—$S$—$SiEt_3$, $(PrO)_2(Me)Si$—$CH_2$—$S$—$SiEt_3$, $(BuO)_2(Me)Si$—$CH_2$—$S$—$SiEt_3$, $(MeO)_2(Me)Si$—$CH_2$—$CMe_2$-$CH_2$—$S$—$SiEt_3$, (EtO)₂(Me)Si—CH₂—CMe₂-CH₂—S—SiEt₃, (PrO)₂(Me)Si—CH₂—CMe₂-CH₂—S—SiEt₃, (BuO)₂(Me)Si—CH₂—CMe₂-CH₂—S—SiEt₃, (MeO)₂(Me)Si—CH₂—C(H)Me-CH₂—S—SiEt₃, (EtO)₂(Me)Si—CH₂—C(H)Me-CH₂—S—SiEt₃, (PrO)₂(Me)Si—CH₂—C(H)Me-CH₂—S—SiEt₃, (BuO)₂(Me)Si—CH₂—C(H)Me-CH₂—S—SiEt₃, (MeO)(Me)₂Si—(CH₂)₃—S—SiEt₃, (EtO)(Me)₂Si—(CH₂)₃—S—SiEt₃, (PrO)(Me)₂Si—(CH₂)₃—S—SiEt₃, (BuO)(Me)₂Si—(CH₂)₃—S—SiEt₃, (MeO)(Me)₂Si—(CH₂)₂—S—SiEt₃, (EtO)(Me)₂Si—(CH₂)₂—S—SiEt₃, (PrO)(Me)₂Si—(CH₂)₂—S—SiEt₃, (BuO)(Me)₂Si—(CH₂)₂—S—SiEt₃, (MeO)(Me)₂Si—CH₂—S—SiEt₃, (EtO)(Me)₂Si—CH₂—S—SiEt₃, (PrO)(Me)₂Si—CH₂—S—SiEt₃, (BuO)(Me)₂Si—CH₂—S—SiEt₃, (MeO)(Me)₂Si—CH₂—CMe₂-CH₂—S—SiEt₃, (EtO)(Me)₂Si—CH₂—CMe₂-CH₂—S—SiEt₃, (PrO)(Me)₂Si—CH₂—CMe₂-CH₂—S—SiEt₃, (BuO)(Me)₂Si—CH₂—CMe₂-CH₂—S—SiEt₃, (MeO)(Me)₂Si—CH₂—C(H)Me-CH₂—S—SiEt₃, (EtO)(Me)₂Si—CH₂—C(H)Me-CH₂—S—SiEt₃, (PrO)(Me)₂Si—CH₂—C(H)Me-CH₂—S—SiEt₃ and (BuO)(Me)₂Si—CH₂—C(H)Me-CH₂—S—SiEt₃.

The modifying compound of formula (3) may be prepared by reacting a sulfur-containing compound of formula (10):

$(R^1O)_x(R^2O)_ySi-R^4-SH$    Formula (10)

wherein R¹, R², R⁴, x and y have the same meaning as defined with respect to formula (3), with a compound of formula (8). Preferably, a base such as triethyl amine is used in the reaction for quenching the hydrohalic acid of formula HQ formed.

The modifying compounds of formula (3) may be also prepared by reacting a sulfur-containing compound of formula (11):

$(R^1O)_x(R^2)_ySi-R^4-S-M$    Formula (11)

wherein M is lithium, sodium or potassium and R¹, R², R⁴, x and y have the same meaning as defined with respect to formula (3), with a compound of formula (8).

Use of Modifying Compounds (3) to (6)

The modifying compounds of formulas (3) to (6) may be added intermittently (at regular or irregular intervals) or continuously during the polymerization, but are preferably added when the conversion rate of the polymerization has reached more than 80%, and more preferably at a conversion rate of more than 90 percent. Preferably, a substantial amount of the polymer chain ends are not terminated prior to the reaction with these modifying compounds; that is, the living polymer chain ends are present and capable of reacting with the modifying compound in a polymer chain end modification reaction. The modification reaction with the modifying compounds of formulas (3) to (6) may be carried out before, after or during the addition of the modifying compound of formula (1) or (2). However, the modification reaction with the modifying compounds of formulas (3) to (6) is preferably carried out after the addition of the modifying compounds of formula (1) or (2). In one embodiment, at least 10 percent of the polymer chain ends, such as 10 to 20 percent, preferably at least 20 percent, such as 20 to 40 percent or 40 to 70 percent, as determined by GPC, have reacted with a modifying compound of formula (1) or (2) prior to addition of the modifying compound of formulas (3) to (6). In one embodiment, more than 10 percent, preferably more than 20 percent of the polymer chains, as determined by GPC, formed in the course of the polymerization process are linked with a modifying compound of formula (3) to (6) in the process of polymer end-modification.

The modifying compounds of formulas (3) to (6) may be directly added into the polymer solution without dilution; however, it may be beneficial to add the modifying compound(s) in solution, such as in an inert solvent (e.g. cyclohexane). The total amount of modifying compound of formulas (3) to (6) added to the polymerization varies depending upon the monomer species, modifying compound of formula (1) or (2), modifying compound of formula (3) to (6), reaction conditions and desired end properties of the modified elastomeric polymer, but is generally from 0.05 to 5.00 mol-equivalent, preferably from 0.10 to 2.00 mol-equivalent and most preferably from 0.15 to 1.50 mol-equivalent per mol-equivalent of alkali metal in the organic alkali metal compound used as initiator for the polymerization. The modification reaction may be carried out in a temperature range of from 0 to 150° C., preferably from 15 to 100° C., even more preferably from 25 to 80° C. There is no limitation for the duration of the modification reaction, however with respect to an economical polymerization process, the modification reaction is usually stopped about 5 to 60 minutes after the addition of the modifying compound.

Modified Elastomeric Polymer

The elastomeric polymer of the first aspect of the present invention is obtained by reacting a living anionic elastomeric polymer as defined above with one or more modifying compounds as defined above, namely by reaction with a modifying compound of formula (I), or by reaction with (i) a modifying compound of formula (1) or (2), followed by (ii) a modifying compound of formula (3), (4), (5) or (6). In particular, the reactions of the modifying compounds with the living anionic elastomeric polymer can be carried out as described in WO 2007/047943 and WO 2009/148932, the content and disclosure of each being incorporated herein in its entirety. WO 2007/047943 and WO 2009/148932 refer to modifying compounds as "silane-sulfide modifier", "silane modifier compound" or "modifier compound", each of them being a modifying compound in accordance with the definition of the present application.

The modification reaction with a modifying compound of formula (I) is believed to result in a modified elastomeric polymer represented by the following formula (III):

$(D)_z(R''O)_x(R)_ySi-R'-S-SiR_3$    Formula (III)

wherein D is an elastomeric polymer, x is an integer selected from 0, 1 and 2; y is an integer selected from 0, 1 and 2; z is an integer selected from 1, 2 and 3; x+y+z=3; and R, R'' and R' are as defined with respect to formula (I).

Contact with moisture is believed to result at least partially in a modified elastomeric polymer represented by the following formula (P4):

$(D)_z(HO)_x(R)_ySi-R'-S-SiR_3$    Formula (P4)

wherein D is an elastomeric polymer, x is an integer selected from 0, 1 and 2; y is an integer selected from 0, 1 and 2; z is an integer selected from 1, 2 and 3; x+y+z=3; and R and R' are as defined with respect to formula (1).

The modification with a modifying compound of formula (3), in combination with a modifying compound of formula (1), is believed to result in a modified elastomeric polymer represented by the following formula (P2):

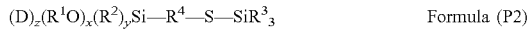

$(D)_z(R^1O)_x(R^2)_ySi-R^4-S-SiR^3_3$    Formula (P2)

wherein D is an elastomeric polymer chain; x is an integer selected from 0 and 1; y is an integer selected from 1 and 2; z is 1; and x+y+z=3; and R¹, R², R³ and R⁴ are as defined with respect to formula (3).

Contact with moisture is believed to result at least partially in a modified elastomeric polymer represented by the following formula (P5):

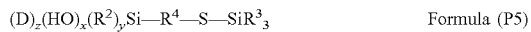  Formula (P5)

wherein D is an elastomeric polymer chain; x is an integer selected from 0 and 1; y is an integer selected from 1 and 2; z is 1; and x+y+z=3; and $R^2$, $R^3$ and $R^4$ are as defined with respect to formula (3).

The trialkylsilyl (—$SiR_3$) group in formula (III) and the trialkylsilyl, tri(alkylaryl)silyl or triarylsilyl (—$SiR^3{}_3$) group in formulas (P1) and (P2) is believed to function as a protective group which prevents unintended subsequent reaction. This protective group may be removed by exposure to a compound containing —OH groups such as water, alcohols, inorganic and organic acids (including hydrochloric acid, sulfuric acid and carboxylic acids), thus forming an "unprotected" thiol (—SH) group. Such conditions are typically present during vulcanization. Depending on the polymer work-up, both the unprotected and/or protected modified elastomeric polymers may be present. For example, steam stripping of the polymer solution containing the modified elastomeric polymer of the present invention will remove a certain portion of the protecting groups resulting in the unprotected form with the thiol group exposed. Alternatively, a water-free work up procedure can enable the preparation of the modified elastomeric polymer according to formula (III), (P1) or (P2).

It is believed that the unprotected thiol group of the modified elastomeric polymer is reactive with fillers such as silica and/or carbon black, if present. Such interaction is believed to result in electrostatic interactions which allow for a more homogeneous distribution of the filler within an elastomeric polymer composition.

It is believed that the silanol group of the modified elastomeric polymer, particularly of the polymers according to Formulas (P3), (P4) and (P5) is reactive with fillers such as for example silica, if present. Such interaction is believed to result in the formation of bonds in case of some fillers, e.g. Si—O—Si bonds in case of silica, or electrostatic interactions which result in a more homogeneous distribution of the filler within an elastomeric polymer composition.

The resulting modified elastomeric polymer preferably comprises sulfide groups (e.g. thiol) in an amount of from 0.0005 to 0.20 or 0.0010 to 0.20 mmol/gram of elastomeric polymer, or from 0.0010 to 0.10 mmol/gram, more preferably from 0.0025 to 0.1 mmol/gram and even more preferably from 0.0025 to 0.05 or from 0.0030 to 0.05 mmol/gram.

Depending on the desired application, the modified elastomeric polymer of the present invention preferably has a Mooney viscosity in the range from 20 to 150, more preferably from 30 to 100 (ML 1+4, 100° C., measured in accordance with ASTM D 1646 (2004) using a Monsanto MV2000 instrument). If the Mooney viscosity is less than 20, abrasion resistance and hysteresis loss properties may be compromised. Moreover, tack and cold flow of the uncrosslinked elastomeric polymer may be increased, resulting in difficult handling, poor green strength and poor dimensional stability during storage. If the Mooney viscosity is more than 150, processability as reflected by filler incorporation and heat build-up in the internal mixer, banding on the roll mill, extrusion rate, extrudate die swell, smoothness, etc. may be impaired, so that the cost of processing increases.

The preferred molecular weight distribution of the subject modified polymer in terms of the ratio of the weight-average molecular weight to the number-average molecular weight, Mw/Mn, preferably ranges from 1.2 to 3.0. Processability of the polymer may be impaired if Mw/Mn is less than 1.2. Poor processability not only increases cost of production, but also impairs blending characteristics of components in a polymer composition, such as insufficient dispersion of fillers and other additives, which may result in poor physical properties. If Mw/Mn is more than 3.0, the content of low molecular weight components increases and hysteresis loss may increase.

Elastomeric Polymer Composition

The elastomeric polymer composition of the present invention comprises the modified elastomeric polymer of the invention and one or more further components selected from components which are added to or formed as a result of the polymerization process used for making the modified elastomeric polymer and components which remain after solvent removal from the polymerization process. Components which are added to the polymerization process include, in particular, oils (extender oils), fillers, stabilizers and further polymers.

In one embodiment, the elastomeric polymer composition of the present invention comprises the modified elastomeric polymer of the present invention in combination with one or more extender oils.

Extender oils for use in the elastomeric polymer composition include mineral oils. Mineral oils can be categorized as aromatic-type extender oils, alicyclic-type extender oils and aliphatic-type extender oils. Among such extender oils, an aromatic-type mineral oil having a viscosity gravity constant (V.G.C.) of 0.900-1.049 (aromatic oil) and an alicyclic-type mineral oil having a V.G.C. of 0.850-0.899 (naphthenic oil) are particularly preferred to ensure improved low temperature hysteresis loss properties and associated improved wet skid resistance. Suitable extender oils include MES (Mild Extraction Solvate), TDAE (Treated Distillate Aromatic Extract), RAE (Residual Aromatic Extract), DAE and NAP (naphthenic). Native oils may also be used as extender oils. The aforementioned extender oils contain varying concentrations of polycyclic aromatic compounds, paraffinics, naphthenics and aromatics and have different glass transition temperatures (for specifications see "Kautschuk Gummi Kunststoffe", vol. 52, pages 799-805). MES and TDAE are especially preferred extender oils for rubber.

The extension of a modified elastomeric polymer of the present invention with an extender oil ensures homogeneous dispersion of fillers such as carbon black and silica in the polymer and improves processability and other properties of vulcanized articles produced from the polymer composition. The amount of extender oil used in the present invention is usually from 0 to 100 parts by weight, preferably from 0 to 80 parts by weight, and more preferably from 0 to 70 parts by weight, for 100 parts by weight of modified elastomeric polymer, as final bulk polymer reaction product, prior to rubber compounding and vulcanization processes. When the extender oil is added to the polymer solution, the timing of addition should be after modification of the polymer or termination of the polymerization, for example after the addition of the modifying agent or polymerization termination agent. After the addition of extender oil, the oil-extended polymer composition is obtained by separating any polymerization solvent from the polymer by means of a direct drying method or steam stripping, drying the rubber using a vacuum dryer, hot-air dryer, roller and the like.

In another embodiment, the elastomeric polymer composition, which optionally comprises one or more extender oils as defined above, further comprises one or more fillers. Fillers serve as reinforcement agents and include carbon nanotubes (CNT) (including discrete CNT, hollow carbon fibers (HCF) and modified CNT carrying one or more functional groups, such as hydroxyl, carboxyl and carbonyl groups), carbon black (including electroconductive carbon black), graphite, graphene (including discrete graphene platelets), silica, carbon-silica dual-phase filler, clays (layered silicates, including exfoliated nanoclay and organoclay), calcium carbonate, magnesium carbonate, lignin, amorphous fillers, such as glass particle-based fillers, starch-based fillers, and combinations thereof. The combined use of carbon black with silica, the use of carbon-silica dual-phase filler, the combined use of carbon-silica dual-phase filler with carbon black and/or silica, and the combined use of carbon nanotubes with one or more of carbon-silica dual-phase filler, carbon black and silica and optionally other nano-fillers is preferred.

Suitable carbon black can be manufactured by a furnace method, thus having a nitrogen adsorption specific surface area of 50-200 $m^2/g$ and a DBP oil absorption of 80-200 ml/100 grams. Examples of preferred types of carbon black include FEF, HAF, ISAF and SAF class carbon black, and electroconductive carbon black. High agglomeration-type carbon black is particularly preferable. Carbon black is typically added in an amount of from 2 to 100 parts by weight, preferably 5 to 100 parts by weight, more preferably 10 to 100 parts by weight, even more preferably 10 to 95 parts by weight per 100 parts by weight of the total elastomeric polymer in the polymer composition.

Examples of silica fillers include wet process silica, dry process silica and synthetic silicate-type silica. Silica having a small particle diameter exhibits a high reinforcing effect. Small diameter, high agglomeration-type silica (i.e. having a large surface area and high oil absorptivity) exhibits excellent dispersibility in the elastomeric polymer composition, thus contributing to desirable properties and superior processability. An average particle diameter of silica in terms of the primary particle diameter is preferably from 5 to 60 nm, more preferably from 10 to 35 nm. The specific surface area of the silica particles (measured by the BET method using nitrogen) is preferably from 45 to 280 $m^2/g$. Silica is typically added in an amount of from 10 to 100 parts by weight, preferably 30 to 100 parts by weight, even more preferably from 30 to 95 parts by weight per 100 parts by weight of the total elastomeric polymer in the polymer composition. Carbon black and silica may be added together, in which case the total amount of carbon black and silica added is from 30 to 100 parts by weight, preferably from 30 to 95 parts by weight per 100 parts by weight of the total elastomeric polymer. As long as the fillers are homogeneously dispersed in the elastomeric composition, increasing quantities (within the above cited ranges) results in a composition having excellent rolling and extruding processability, and vulcanized products exhibiting favorable hysteresis loss properties, rolling resistance, improved wet skid resistance, abrasion resistance and tensile strength.

Carbon-silica dual-phase filler can exhibit the same effects as those obtained by the combined use of carbon black and silica, even in the case where it is added alone. Carbon-silica dual-phase filler is a so-called silica-coated carbon black made by coating silica onto the surface of carbon black and is commercially available under the trademark CRX2000, CRX2002 or CRX2006 (products of Cabot Co.). Carbon-silica dual-phase filler is added in the same amounts as previously described with respect to silica. Carbon-silica dual-phase filler can be used in combinations with other fillers, for example carbon nanotubes, carbon black, silica, clay, calcium carbonate and magnesium carbonate. Among these fillers, the use with carbon black and/or silica is preferred.

Apart from modified elastomeric polymer and extender oil and/or filler, the elastomeric polymer composition of the present invention may additionally contain one or more further components, including, but not limited to coupling agents and further elastomeric polymers.

Further elastomeric polymers as referred to herein are elastomeric polymers which are not in accordance with the modified polymer of the invention. They include further unmodified elastomeric polymers and further modified elastomeric polymers. Further unmodified elastomeric polymers refer to uncrosslinked elastomeric polymers which have not been reacted with the modifying compounds in accordance with the present invention, but have been prepared and terminated in a conventional manner. Further modified elastomeric polymers are derived from uncrosslinked unmodified elastomeric polymers, which have been reacted with modifying compounds not in accordance with the present invention. The modified elastomeric polymer of the present invention preferably constitutes at least 30 weight percentage of the total elastomeric polymer present in the elastomeric polymer composition, more preferably at least 50 weight percentage. The remaining portion of the elastomeric polymer is composed of the further elastomeric polymers, including modified and unmodified embodiments thereof. Preferred further elastomeric polymers include cis-1,4-isoprene polymer, natural rubber, 1,2- and 3,4-isoprene polymer, styrene/butadiene copolymer, styrene/isoprene/butadiene terpolymer, polybutadiene including (i) polybutadiene comprising at least 90 wt % cis-1,4-polybutadiene units and (ii) low cis-polybutadiene comprising less than 40 wt % cis-polybutadiene and more than 5 wt % 1,2-polybutadiene units and (iii) polybutadiene comprising more than 75 wt % trans-1,4-polybutadiene units, acrylonitrile/butadiene copolymer and chloroprene polymer, including combinations of two or more thereof. Styrene-butadiene copolymer, natural rubbers, polyisoprene and polybutadiene are preferred. It is desirable that the further elastomeric polymers (modified or unmodified) have a Mooney viscosity (ML 1+4, 100° C. according to ASTM D 1646 (2004)) in the range of from 20 to 200, preferably from 25 to 150. The addition of the further elastomeric polymers in the above ranges ensures manufacturing of the elastomeric polymer composition of the present invention at a low cost, without substantially impairing its characteristics.

It is preferable to add a silane coupling agent to the polymer composition when silica or carbon-silica dual-phase-filler is used. The typical amount of a silane coupling agent added is from about 1 to about 20 parts by weight, preferably from 5 to 15 parts by weight per 100 parts by weight of the total amount of silica and/or carbon-silica dual-phase-filler. A silane coupling agent is preferred which has in its molecule both a functional group reactive towards a silica surface, such as an alkoxysilyl group, and a functional group reactive towards a carbon-carbon double bond of a polymer, such as a polysulfide group, mercapto group or epoxy group. Examples include bis-(3-triethoxysilylpropyl)tetrasulfide, bis-(3-triethoxysilylpropyl)disulfide, bis-(2-triethoxysilyethyl)tetrasulfide, bis-(2-triethoxysilylethyl) disulfide, 3-mercaptopropyltrimethoxysilane, 3-triethoxysilylpropyl-N,N-dimethylthiocarbamoyl tetrasulfide, 3-triethoxysilylpropylbenzothiazole tetrasulfide and 3-octanoylthio-1-propyltriethoxysilane (NXT silane, Crompton Corporation). The use of such silane coupling agent increases the reinforcing effect brought about by the combined use of carbon black and silica or the use of carbon-silica dual-phase filler.

The elastomeric polymer composition of the present invention preferably does not comprise a vulcanizing agent.

The present invention will be explained in more detail by way of examples, which are not intended to be limiting of the present invention.

EXAMPLES

Modifying compound (A) is an example of formula (1) and has the following chemical structure: $(MeO)_3Si—(CH_2)_2—S—SiMe_2C(Me)_3$ Modifying compound (B) is an example of formula (3) and has the following chemical structure: $(MeO)_2(Me)Si—(CH_2)_2—S—SiMe_2C(Me)_3$

Comparative Example C1 (High Vinyl Bond Content SSBR not Modified with (A) or (B))

18742.3 g cyclohexane, 1824.6 g butadiene, 208.26 g styrene and 14.750 mmol TMEDA were charged to a deaerated 40 l reactor and the stirred mixture was heated up to 40° C. Then n-butyllithium was charged dropwise to react with the impurities comprised in the reaction mixture until the color of the reaction mixture went to yellowish (titration step). After that the recipe amount of 17.036 mmol n-butyllithium corresponding to the target molecular weight of the polymer was charged immediately via pump to start the polymerization. The start time of the charge of the main amount of n-butyllithium was used as the start time of the polymerization. The first polymerization step is characterized by a usual batch polymerization for 10 minutes without charge of any additional reactants. In parallel the temperature was increased by heating or cooling via hot water in the wall of the reactors beginning with the charge of the main amount of n-butyllithium to the final polymerization temperature Tpm of 60° C. with a rate of 2° C./min. After these 10 minutes the first charge step of 1328.4 g butadiene and 151.04 g styrene started using a constant feed rate for 60 minutes. The reaction time of 20 minutes was allowed to complete the conversion. 13.94 g butadiene were added within one minute with a pump, followed by the addition of 1.3534 mmol tin tetrachloride and 50 g cyclohexane via a cylinder. The second addition of 51.36 g butadiene was done 20 minutes later within one minute. The reaction was allowed to complete within 15 minutes. After that 71.8 g methanol was charged for termination of the reaction. The polymer solution was stabilized with 7.13 g Irganox 1520, the polymer recovered by steam stripping and dried until a content of residual volatiles <0.7% was obtained. The vinyl bond content of the polymer was 52.0%. The styrene content was 10.6%. The glass transition temperature of the polymer was −46.2° C. The complete data set of the sample is given in Table 1.

Comparative Example C2 (High Vinyl Bond Content SSBR Modified with (B))

18714.5 g cyclohexane, 1821.7 g butadiene, 207.66 g styrene and 14.555 mmol TMEDA were charged to a deaerated 40 l reactor and the stirred mixture was heated up to 40° C. Then n-butyllithium was charged dropwise to react the impurities until the color of the reaction mixture changed to yellowish (titration step). After that the recipe amount of 16.591 mmol n-butyllithium corresponding to the target molecular weight of the polymer was charged immediately via pump to start the polymerization. The start time of the charge of the main amount of n-butyllithium was used as the start time of the polymerization. The first polymerization step is characterized by a usual batch polymerization for 10 minutes without charge of any additional reactants. In parallel the temperature was increased by heating or cooling via hot water in the wall of the reactors beginning with the charge of the main amount of n-butyllithium to the final polymerization temperature Tpm of 60° C. with a rate of 2° C./min. After these 10 minutes the first charge step of 1326.4 g butadiene and 150.74 g styrene started using a constant feed rate for 60 minutes. The reaction time of 20 minutes was allowed to complete the conversion. 13.94 g butadiene were added within one minute with a pump, followed by the addition of 1.3467 mmol tin tetrachloride and 50 g cyclohexane via a cylinder. The second addition of 51.36 g butadiene was done 20 minutes later within one minute, followed by the addition of 15.6295 mmol (B). The reaction was allowed to complete within 15 minutes. After that 71.8 g methanol was charged for termination of the reaction. The polymer solution was stabilized with 7.13 g Irganox 1520, the polymer recovered by steam stripping and dried until a content of residual volatiles <0.7% was obtained. The vinyl bond content of the polymer was 52.8%. The styrene content was 10.5%. The glass transition temperature of the polymer was −45.4° C. The complete data set of the sample is given in Table 1.

Comparative Example C3 (High Vinyl Bond Content SSBR Modified with (A) and (B))

18724.8 g cyclohexane, 1823.1 g butadiene, 207.76 g styrene and 13.9647 mmol TMEDA were charged to a deaerated 40 l reactor and the stirred mixture was heated up to 40° C. Then n-butyllithium was charged dropwise to react the impurities until the color of the reaction mixture changed to yellowish (titration step). After that the recipe amount of 18.3452 mmol n-butyllithium corresponding to the target molecular weight of the polymer was charged immediately via pump to start the polymerization. The start time of the charge of the main amount of n-butyllithium was used as the start time of the polymerization. The first polymerization step is characterized by a usual batch polymerization for 10 minutes without charge of any additional reactants. In parallel the temperature was increased by heating or cooling via hot water in the wall of the reactors beginning with the charge of the main amount of n-butyllithium to the final polymerization temperature Tpm of 60° C. with a rate of 2° C./min. After these 10 minutes the first charge step of 1326.6 g butadiene and 150.74 g styrene started using a constant feed rate for 60 minutes. The reaction time of 20 minutes was allowed to complete the conversion. 14.04 g butadiene were added within one minute with a pump, followed by the addition of 2.9766 mmol (A) and 50 g cyclohexane via cylinder. The second addition of 51.46 g butadiene was done 20 minutes later within one minute, followed by the addition of 15.748 mmol (B). The reaction was allowed to complete within 15 minutes. After that 71.8 g methanol was charged for termination of the reaction. The polymer solution was stabilized with 7.13 g Irganox 1520, the polymer recovered by steam stripping and dried until a content of residual volatiles <0.7% was obtained. The vinyl bond content of the polymer was 49.3%. The styrene content was 10.2%. The glass transition temperature of the polymer was −49.4° C. The complete data set of the sample is given in Table 1.

Comparative Example C4 (Low Vinyl Bond Content SSBR not Modified with (A) or (B))

19788.6 g cyclohexane and 270.54 g styrene were charged to a deaerated 40 l reactor and the stirred mixture was heated up to 60° C. Then n-butyllithium was charged dropwise to react the impurities until the color of the reaction mixture changed to yellowish (titration step). After that the recipe amount of 13.5484 mmol n-butyllithium corresponding to the target molecular weight of the polymer was charged immediately via pump to start the polymerization. The start time of the charge of the main amount of n-butyllithium was used as the start time of the polymerization. Immediately after start of the polymerization 1581.78 g butadiene were charged with a constant feed rate over 75 minutes. In parallel the temperature was increased by heating or cooling via hot water in the wall of the reactors beginning with the charge of the main amount of n-butyllithium to the final polymerization temperature Tpm of 85° C. with a rate of 2.08° C./min. After the first charge additional 791.16 g butadiene were charged using a constant feeding rate during further 75 minutes. The reaction time of 30 minutes was allowed to complete the conversion. 11.94 g butadiene were added within one minute with a pump, followed by the addition of 1.3159 mmol tin tetrachloride and 50 g cyclohexane via cylinder. The second addition of 44.26 g butadiene was done 20 minutes later within one minute. The reaction was allowed to complete within 15 minutes. The reaction was terminated with charge of 65.5 g methanol. The polymer solution was stabilized with 5.40 g Irganox 1520, the polymer recovered by steam stripping and dried until a content of residual volatiles <0.7% was obtained. The vinyl bond content of the polymer was 8.8%. The styrene content was 10.5%. The glass transition temperature of the polymer was −82.4° C. The complete data set of the sample is given in Table 1.

Example E1

19748 g cyclohexane and 270.13 g styrene were charged to a deaerated 40 l reactor and the stirred mixture was heated up to 60° C. Then n-butyllithium was charged dropwise to react the impurities until the color of the reaction mixture changed to yellowish (titration step). After that the recipe amount of 13.5119 mmol n-butyllithium corresponding to the target molecular weight of the polymer was charged immediately via pump to start the polymerization. The start time of the charge of the main amount of n-butyllithium was used as the start time of the polymerization. Immediately after start of the polymerization 1578.48 g butadiene were charged with a constant feed rate over 75 minutes. In parallel the temperature was increased by heating or cooling via hot water in the wall of the reactors beginning with the charge of the main amount of n-butyllithium to the final polymerization temperature Tpm of 85° C. with a rate of 2.08° C./min. After the first charge additional 789.46 g butadiene were charged using a constant feeding rate during further 75 minutes. The reaction time of 30 minutes was allowed to complete the conversion. 11.94 g butadiene were added within one minute with a pump, followed by the addition of 1.3169 mmol tin tetrachloride and 50 g cyclohexane via cylinder. The second addition of 44.16 g butadiene was done 20 minutes later within one minute followed by the addition of 14.28 mmol (B). The reaction was allowed to complete within 15 minutes. The reaction was terminated with charge of 65.2 g methanol. The polymer solution was stabilized with 5.40 g Irganox 1520, the polymer recovered by steam stripping and dried until a content of residual volatiles <0.7% was obtained. The vinyl bond content of the polymer was 8.6%. The styrene content was 10.4%. The glass transition temperature of the polymer was −82.9° C. The complete data set of the sample is given in Table 2.

Example E2

19781.7 g cyclohexane and 270.74 g styrene were charged to a deaerated 40 l reactor and the stirred mixture was heated up to 60° C. Then n-butyllithium was charged dropwise to react the impurities until the color of the reaction mixture changed to yellowish (titration step). After that the recipe amount of 13.5119 mmol n-butyllithium corresponding to the target molecular weight of the polymer was charged immediately via pump to start the polymerization. The start time of the charge of the main amount of n-butyllithium was used as the start time of the polymerization. Immediately after start of the polymerization 1581.08 g butadiene were charged with a constant feed rate over 75 minutes. In parallel the temperature was increased by heating or cooling via hot water in the wall of the reactors beginning with the charge of the main amount of n-butyllithium to the final polymerization temperature Tpm of 85° C. with a rate of 2.08° C./min. After the first charge additional 790.76 g butadiene were charged using a constant feeding rate during further 75 minutes. The reaction time of 30 minutes was allowed to complete the conversion. 11.94 g butadiene were added within one minute with a pump, followed by the addition of 2.2581 mmol (A) and 50 g cyclohexane via cylinder. The second addition of 44.16 g butadiene was done 20 minutes later within one minute followed by the addition of 14.327 mmol (B). The reaction was allowed to complete within 15 minutes. The reaction was terminated with charge of 65.2 g methanol. The polymer solution was stabilized with 5.4 g Irganox 1520, the polymer recovered by steam stripping and dried until a content of residual volatiles <0.7% was obtained. The vinyl bond content of the polymer was 8.8%. The styrene content was 10.5%. The glass transition temperature of the polymer was −83.2° C. The complete data set of the sample is given in Table 2.

Comparative Example C5 (Low Vinyl Unit Comprising SSBR not Modified with (A) or (B))

5007.7 g cyclohexane and 410.98 g styrene were charged to a deaerated 20 l reactor and the stirred mixture was heated up to 60° C. Then n-butyllithium was charged dropwise to react the impurities until the color of the reaction mixture changed to yellowish (titration step). After that the recipe amount of 5.9485 mmol n-butyllithium corresponding to the target molecular weight of the polymer was charged immediately via pump to start the polymerization. The start time of the charge of the main amount of n-butyllithium was used as the start time of the polymerization. The temperature was increased by heating or cooling via hot water in the wall of the reactors beginning with the charge of the main amount of n-butyllithium to the final polymerization temperature Tpm of 85° C. with a rate of 2.08° C./min. In parallel the first charge step of 335.62 g butadiene started using a constant feed rate for 45 minutes. No reaction time was allowed afterwards. 253.35 g Butadiene were charged as next with a constant feeding rate for additional 105 minutes. The reaction was allowed to complete within 15 minutes. Then 12.67 g butadiene were added within one minute with a pump, followed by the addition of 0.5625 mmol tin tetrachloride and 50 g cyclohexane via cylinder. The second addition of 12.67 g butadiene was done 20 minutes later within one minute. The reaction was allowed to complete within 15 minutes. The reaction was terminated with charge of 12.3 g methanol. The polymer solution was stabilized with 2.04 g Irganox 1520, the polymer recovered by steam stripping and dried until a content of residual volatiles <0.7% was obtained. The vinyl bond content of the polymer was 8.1%. The styrene content was 40.5%. The glass transition temperature of the polymer was −42.9° C. The complete data set of the sample is given in Table 1.

a reaction time of 20 minutes was allowed to complete the reaction. Then 11.64 g butadiene were added within one minute with a pump, followed by the addition of 2.786 mmol (A) and 50 g cyclohexane via cylinder. The second addition of 42.96 g butadiene was done 20 minutes later within one minute, followed by the addition of 16.781 mmol (B). The reaction was allowed to complete within 15 minutes The reaction was terminated with charge of 76.8 g methanol. The polymer solution was stabilized with 7.2 g Irganox 1520, the polymer recovered by steam stripping and dried until a content of residual volatiles <0.7% was obtained. The vinyl bond content of the polymer was 28.9%. The styrene content was 24.9%. The glass transition temperature of the polymer was −50.7° C. The complete data set of the sample is given in Table 1.

TABLE 1

Data of comparative polymer examples C1-C6

| Sample | C1 | C2 | C3 | C4 | C5 | C6 |
|---|---|---|---|---|---|---|
| ML1 + 4(100° C.) | 67.6 | 70.1 | 61.5 | 57.4 | 68.9 | 66 |
| CR (%) | 21.5 | 29.9 | 31.0 | 26.9 | 30.9 | 32.0 |
| Mp (g/mol) | 337120 | 345902 | 326873 | 323750 | 263704 | 289916 |
| Mn (g/mol) | 347991 | 393113 | 358731 | 355602 | 307876 | 331160 |
| Mw (g/mol) | 465766 | 555579 | 441654 | 517226 | 466904 | 426404 |
| D | 1.338 | 1.413 | 1.231 | 1.455 | 1.517 | 1.288 |
| Vinyl (%) | 52 | 52.8 | 49.2 | 8.8 | 8.1 | 29.5 |
| Styrene (%) | 10.6 | 10.5 | 10.2 | 10.5 | 40.5 | 24.9 |
| Blockstyrene (%) | n.n. | n.n. | n.n. | 4 | 5 | 4 |
| Tg (° C.) | −46.2 | −45.4 | −49.4 | −82.4 | −42.9 | −50.2 |
| Modification | no | 1 | 2 | no | no | 2 |

Comparative Example C6 (High Vinyl Unit Comprising SSBR not Modified with (A) or (B))

18895.8 g cyclohexane, 521.09 g styrene, 1532.84 g butadiene and 11.6145 mmol TMEDA were charged to a 40 liter reactor under a nitrogen atmosphere and the mixture was heated to 55° C. while stirring. Next, n-butyl lithium were charged dropwise to the mixture (to react with impurities) until the color of the reaction mixture changed to yellowish (titration step). Next 19.1583 mmol n-butyl lithium, corresponding to the target molecular weight of the polymer, was charged immediately via a pump to initiate the polymerization. The start time of the charge recipe amount of n-butyl lithium was used as the start time of the first polymerization reaction. The reaction temperature was adjusted using hot water circulation in the wall of the reactors, beginning after the charge of the n-butyl-lithium to a final polymerization temperature Tpm of 75° C. at a rate of 2° C./min to accelerate the polymerization reaction, and shorten the reaction time. The first polymerization step is characterized by a usual batch polymerization for 10 minutes without charge of any additional reactants. After that 1116.31 g butadiene and 379.71 g styrene were charged using a constant feed rate for 60 minutes. After this addition

TABLE 2

Data of inventive polymer examples E1-E2

| Sample | E1 | E2 |
|---|---|---|
| ML1 + 4(100° C.) | 64.1 | 65.5 |
| CR (%) | 28.5 | 32.0 |
| Mp (g/mol) | 318811 | 303178 |
| Mn (g/mol) | 356031 | 343274 |
| Mw (g/mol) | 515249 | 475141 |
| D | 1.4472 | 1.384 |
| Vinyl (%) | 8.6 | 8.8 |
| Styrene (%) | 10.4 | 10.5 |
| Blockstyrene (%) | 5 | 9 |
| Tg (° C.) | −82.9 | −83.2 |
| Modification | 1 | 2 |

The introduction of the modification in case of low vinyl bond polymers E1, E2 vs. C4 in Table 3 results in a significant improvement of the dynamic performance. Especially there is a relatively strong improvement of the HBU (heat build-up) (13-28%) compared with the effect in case of medium or high vinyl polymers C2, C3 vs. C1 (0-10%). The use of the inventive modified low vinyl bond polymers would result in significant lower abrasion, improved rolling resistance, but in addition also in a reduced HBU.

TABLE 3

Vulcanized filled modified polymer composition performance Compound formulation 1

| Polymer | Vinyl bond content [%] | Styrene content [%] | Modification | Sample Tg [° C.] | HBU sample [° C.] | HBU sample vs unmodified (%) | DIN abrasion [mm3] | tan d @ −10° C. | tan d @ 0° C. | tan d @ 60° C. |
|---|---|---|---|---|---|---|---|---|---|---|
| C1 | 52.0 | 10.6 | no | −46.2 | 132 | 100 | 118 | 0.234 | 0.211 | 0.143 |
| C2 | 52.8 | 10.5 | 1 | −45.4 | 141 | 93 | 109 | 0.247 | 0.225 | 0.150 |
| C3 | 49.2 | 10.2 | 2 | −49.4 | 117 | 112 | 98 | 0.233 | 0.190 | 0.102 |

TABLE 3-continued

Vulcanized filled modified polymer composition performance Compound formulation 1

| Polymer | Vinyl bond content [%] | Styrene content [%] | Modifi- cation | Sample Tg [° C.] | HBU sample [° C.] | HBU sample vs unmodified (%) | DIN abrasion [mm3] | tan d @ −10° C. | tan d @ 0° C. | tan d @ 60° C. |
|---|---|---|---|---|---|---|---|---|---|---|
| C4 | 8.8 | 10.5 | no | −82.4 | 177 | 100 | 52 | 0.190 | 0.179 | 0.149 |
| E1 | 8.6 | 10.4 | 1 | −82.9 | 157 | 113 | 52 | 0.178 | 0.170 | 0.135 |
| E2 | 8.8 | 10.5 | 2 | −83.2 | 138 | 128 | 50 | 0.176 | 0.164 | 0.119 |

Elastomeric Polymer Compositions Used

| Mixing stage | Formulation 1 | phr |
|---|---|---|
| 1 | SSBR[1] | 80.0 |
|  | Buna ® cis 132-Schkopau | 20.0 |
|  | Ultrasil ® 7000 GR | 80.0 |
|  | Si 75 ® | 6.9 |
|  | TDAE VivaTec500 | 20.0 |
|  | Stearic acid | 1.0 |
|  | Zinc oxide | 2.5 |
|  | Dusantox ® 6PPD | 2.0 |
|  | Wax Antilux 654 | 1.5 |
| 2 | Sulfur | 1.4 |
|  | TBBS | 1.5 |
|  | DPG | 1.5 |

[1]comparative polymer examples or inventive polymer examples are used

Methods

The molecular weight analyses were carried out by SEC/RI using a HEWLETT PACKARD HP 1100. The eluent THF was degassed on line. The solvent flow rate was 1.0 ml/min. 100 μL of polymer solution were injected per analysis. The analyses were carried out at 40° C. The molecular weights were initially calculated based on a polystyrene calibration and given in the tables as polystyrene. The real molecular weights (SSBR molecular weights) were determined by division by a factor derived from an earlier comparison between molecular weights from SEC/RI and SEC/MALLS. The value of the factor depends on the polymer composition (styrene and butadiene content). A factor of 1.64 was used for SSBR containing 10% styrene, a factor of 1.52 was used for SSBR with 25% styrene, and a factor of 1.47 was used for SSBR with 40% styrene. Mp (as SSBR) was used for the calculation of TMEDA, (A), (B)/active sites (I*) molar ratios.

$^1$H-NMR-spectroscopy was used to determine the vinyl bond content and styrene content. The samples were dissolved in deuterated chloroform and the spectra were obtained using a Bruker 200 MHz spectrometer. Longblock refers to styrene blocks with more than 6 consecutive styrene units. Vinyl bond content VC refers to the 1,2-polybutadiene comprised in the polybutadiene fraction of the copolymer.

The glass transition temperature was determined using the DSC Q2000 under the following conditions:

| Weight: | ca. 10-12 mg |
|---|---|
| Sample container: | Alu/S |
| Temperature range: | (−140 . . . 80) ° C. |
| Heating rate: | 20 K/min respectively 5 K/min |
| Cooling rate: | free cooling |
| Purge gas: | 20 ml Ar/min |
| Cooling agent: | liquid nitrogen |

Each sample was measured at least once. The measurements involve two heating runs. The 2nd heating run was used to determine the glass transition temperature.

Measurements of non-vulcanized rheological properties according to ASTM D 5289-95 were made using a rotor-less shear rheometer (MDR 2000 E) to characterize cure characteristics. Test pieces were vulcanized by t95 at 160° C., especially for hardness and rebound resilience tests the specimen were vulcanized by t95+5 min at 160° C. Tensile strength and moduli were measured according to ASTM D 412 on a Zwick Z010. DIN abrasion was measured according to DIN 53516 (1987-06-01). Hardness Shore A (ASTM D 2240) and rebound resilience (ISO 4662) were measured at 0° C., RT and 60° C. Dynamic properties, i.e. tan δ at 0° C. and 60° C., were measured using dynamic spectrometer Eplexor 150N/500N manufactured by Gabo Qualimeter Testanlagen GmbH (Germany) applying a compression dynamic strain of 0.2% at a frequency of 2 Hz. Heat build-up was measured according to ASTM D 623, method A, on a Doli 'Goodrich'-Flexometer.

The invention claimed is:

1. A modified elastomeric polymer obtained by reacting a living anionic elastomeric polymer and a modifying compound of the following formula (I):

$(R''O)_x(R)_ySi-R'-S-SiR_3$   Formula (I)

wherein R is independently $C_1$-$C_{16}$ alkyl or benzyl; R" is $C_1$-$C_4$ alkyl; R' is selected from $C_6$-$C_{18}$ aryl, $C_7$-$C_{50}$ alkylaryl, $C_1$-$C_{50}$ alkyl and $C_2$-$C_{50}$ dialkylether, wherein each group is optionally substituted with one or more groups selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl)amino, bis(tri($C_1$-$C_{12}$ alkyl)silyl)amino, tris($C_1$-$C_7$ hydrocarbyl)silyl and $C_1$-$C_{12}$ thioalkyl; x is an integer selected from 1, 2 and 3; y is an integer selected from 0, 1 and 2; and x+y=3, and wherein the living anionic elastomeric polymer comprises at least 75% and less than 99% by weight of butadiene units and more than 1% and up to 25% by weight of styrene units and has a vinyl bond content of from 2 to less than 10%, based on the polybutadiene fraction of the living anionic elastomeric polymer.

2. The modified elastomeric polymer according to claim 1, wherein R is independently selected from $C_1$-$C_5$ alkyl and R' is $C_1$-$C_5$ alkyl.

3. The method of preparing the modified elastomeric polymer as defined in claim 1, comprising the step of reacting the living anionic elastomeric polymer and the modifying compound of formula (I).

4. The modified elastomeric polymer according to claim 1, obtained by reacting a living anionic elastomeric polymer with a modifying compound of the following formula (1) and at least one of the modifying compounds of the following formulas (3), (4), (5) and (6):

$(R^1O)_3Si-R^4-S-SiR^3_3$   Formula (1)

-continued

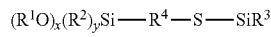  Formula (3)

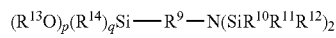  Formula (4)

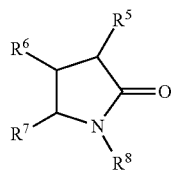  Formula (5)

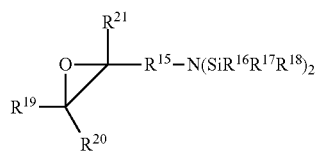  Formula (6)

wherein $R^2$, $R^3$, $R^{10}$, $R^{11}$, $R^{12}$, $R^{14}$, $R^{16}$, $R^{17}$ and $R^{18}$ are independently selected from $C_1$-$C_{16}$ alkyl and benzyl, wherein alkyl groups for $R^{10}$, $R^{11}$ and $R^{12}$ and for $R^{16}$, $R^{17}$ and $R^{18}$ may bond to each other so as to form a ring comprising two Si atoms and N; $R^1$ and $R^{13}$ are independently selected from $C_1$-$C_4$ alkyl; $R^4$, $R^9$ and $R^{15}$ are independently selected from $C_6$-$C_{18}$ aryl, $C_7$-$C_{50}$ alkylaryl, $C_1$-$C_{50}$ alkyl and $C_2$-$C_{50}$ dialkylether, wherein each group is optionally substituted with one or more groups selected from $C_1$-$C_4$ alkyl, $C_1$-$C_4$ alkoxy, $C_6$-$C_{12}$ aryl, $C_7$-$C_{16}$ alkylaryl, di($C_1$-$C_7$ hydrocarbyl) amino, bis(tri($C_1$-$C_{12}$ alkyl)silyl)amino, tris($C_1$-$C_7$ hydrocarbyl)silyl and $C_1$-$C_{12}$ thioalkyl; $R^5$, $R^6$ and $R^7$ are independently selected from hydrogen, $C_1$-$C_{16}$ alkyl and $C_6$-$C_{12}$ aryl; $R^8$ is selected from $C_1$-$C_{16}$ alkyl and $C_6$-$C_{12}$ aryl; and $R^{19}$, $R^{20}$ and $R^{21}$ are independently selected from hydrogen and $C_1$-$C_{16}$ alkyl; x and p are each an integer selected from 1 and 2; y and q are each an integer selected from 1 and 2; x+y=3; and p+q=3, and wherein the living anionic elastomeric polymer comprises at least 75% and less than 99% by weight of butadiene units and more than 1% and up to 25% by weight of styrene units and has a vinyl bond content of from 2 to less than 10%, based on the polybutadiene fraction of the living anionic elastomeric polymer.

5. The modified elastomeric polymer according to claim 4, wherein in formulas (1) and (2) $R^1$ and $R^{13}$ are independently selected from $C_1$-$C_4$ alkyl; $R^3$, $R^{10}$, $R^{11}$ and $R^{12}$ are independently selected from $C_1$-$C_{16}$ alkyl and benzyl; and $R^4$ and $R^9$ are independently selected from $C_1$-$C_{16}$ alkyl, $C_6$-$C_{16}$ aryl and $C_7$-$C_{16}$ alkylaryl.

6. The modified elastomeric polymer according to claim 4, wherein in formulas (3), (4), (5) and (6) $R^2$, $R^3$, $R^8$, $R^{10}$, $R^{11}$, $R^{12}$, $R^{14}$, $R^{16}$, $R^{17}$ and $R^{18}$ are independently selected from $C_1$-$C_{16}$ alkyl, $R^1$ and $R^{13}$ are independently selected from $C_1$-$C_4$ alkyl, $R^5$, $R^6$, $R^7$, $R^{19}$, $R^{20}$ and $R^{21}$ are independently selected from hydrogen and $C_1$-$C_{16}$ alkyl, and $R^4$, $R^9$ and $R^{15}$ are independently selected from $C_1$-$C_{16}$ alkyl, $C_6$-$C_{15}$ aryl and $C_7$-$C_{16}$ alkylaryl.

7. The modified elastomeric polymer according to claim 4, which is obtained by reacting the living anionic elastomeric polymer with a modifying compound of formula (1) to provide a modified polymer and then reacting the modified polymer with at least one of the modifying compounds of formulas (3), (4), (5) and (6).

8. The modified elastomeric polymer according to claim 4, which is obtained by reacting the living anionic elastomeric polymer with a modifying compound of formula (1) and a modifying compound of formula (3).

9. A method of preparing the modified elastomeric polymer as defined in claim 7, comprising the steps of (i) reacting the living anionic elastomeric polymer with a modifying compound of formula (1) to provide a modified polymer and (ii) reacting the modified polymer with at least one of the modifying compounds of formulas (3), (4), (5) and (6).

10. The method according to claim 9, comprising the steps of (i) reacting the living anionic elastomeric polymer with the modifying compound of formula (1) to provide a modified polymer and (ii) reacting the modified polymer with the modifying compound of formula (3).

11. The modified elastomeric polymer according to claim 1, wherein the amount of styrene in the living anionic elastomeric polymer is at least 2% by weight.

12. The modified elastomeric polymer according to claim 11, wherein the living anionic elastomeric polymer is a copolymer of butadiene and styrene.

13. The modified elastomeric polymer according to claim 1, wherein the content of vinyl bonds in the polybutadiene fraction of the living anionic elastomeric polymer is from 4 to 9%.

14. An elastomeric polymer composition comprising the modified elastomeric polymer as defined in claim 1, and one or more further components selected from components which are added to or formed as a result of the polymerization process used for making the modified elastomeric polymer and components which remain after solvent removal from the polymerization process.

15. The elastomeric polymer composition according to claim 14, comprising one or more extender oils.

16. The elastomeric polymer composition according to claim 14, comprising one or more fillers.

17. The elastomeric polymer composition according to claim 16, wherein the one or more fillers are selected from carbon nanotubes, carbon black, silica, carbon-silica dual-phase filler, clay, calcium carbonate and magnesium carbonate.

18. The elastomeric polymer composition according to claim 16, where the filler is selected from a combination of carbon black with silica, carbon-silica dual-phase filler, a combination of carbon-silica dual-phase filler with carbon black and/or silica, and a combination of carbon nanotubes with one or more of carbon-silica dual-phase filler, carbon black and silica.

19. The elastomeric polymer composition according to claim 14, comprising one or more further elastomeric polymers.

20. The method of preparing the modified elastomeric polymer according to claim 9, wherein the amount of styrene in the living anionic elastomeric polymer is at least 2% by weight.

21. The method of preparing the modified elastomeric polymer according to claim 20, wherein the living anionic elastomeric polymer is a copolymer of butadiene and styrene.

22. The method of preparing the modified elastomeric polymer according to claim 9, wherein the content of 1,2-added butadiene (vinyl bond content) in the polybutadiene fraction of the living anionic elastomeric polymer is from 4 to 9%.

* * * * *